United States Patent
Iwuchukwu et al.

(10) Patent No.: US 12,486,536 B2
(45) Date of Patent: Dec. 2, 2025

(54) MICRORNA REGULATORY NETWORK AS BIOMARKERS OF SEIZURE IN PATIENTS WITH SPONTANEOUS INTRACEREBRAL HEMORRHAGE

(71) Applicant: OCHSNER HEALTH SYSTEM, New Orleans, LA (US)

(72) Inventors: Ifeanyi Iwuchukwu, New Orleans, LA (US); Doan Nguyen, New Orleans, LA (US)

(73) Assignee: OCHSNER HEALTH SYSTEM, New Orleans, LA (US)

( * ) Notice: Subject to any disclaimer, the term of this patent is extended or adjusted under 35 U.S.C. 154(b) by 1070 days.

(21) Appl. No.: 17/438,288

(22) PCT Filed: Mar. 10, 2020

(86) PCT No.: PCT/US2020/021896
§ 371 (c)(1),
(2) Date: Sep. 10, 2021

(87) PCT Pub. No.: WO2020/185781
PCT Pub. Date: Sep. 17, 2020

(65) Prior Publication Data
US 2022/0145392 A1    May 12, 2022

Related U.S. Application Data

(60) Provisional application No. 62/816,358, filed on Mar. 11, 2019.

(51) Int. Cl.
*C12Q 1/6883* (2018.01)

(52) U.S. Cl.
CPC ..... *C12Q 1/6883* (2013.01); *C12Q 2600/178* (2013.01)

(58) Field of Classification Search
CPC .............. C12Q 11/6883; C12Q 1/6883; C12Q 2600/178; C40B 40/06
See application file for complete search history.

(56) References Cited

U.S. PATENT DOCUMENTS

2015/0361431 A1    12/2015  Brown
2023/0175066 A1*   6/2023   Ishii ..................... C12Q 1/6869
                                                         435/6.11

FOREIGN PATENT DOCUMENTS

WO   2017/096418 A2   6/2014
WO   2017/096418 A3   6/2014
WO   2017/136662 A1   8/2017
WO   2017/136662 A4   8/2017

OTHER PUBLICATIONS

Zhang et al. (Drug Design, Development and Therapy, 2021:15, 721-733).*
Goswami, Frontiers in Oncology, 2019, vol. 9, pp. 1-25.*
Liu et al., "Brain and Blood microRNA Expression Profiling of Ischemic Stroke, Intracerebral Hemorrhage, and Kainate Seizures" Journal of Cerebral Blood Flow & Metabolism, vol. 30, No. 1 (2010); pp. 92-101.
Henshall, et al., "MicroRNAs in epilepsy: pathophysiology and clinical utility" The Lancet Neurology, Elsevier, Amsterdam, NL, vol. 15, No. 13 (2016); pp. 1368-1376.
Pitkanen et al., "Epilepsy biomarkers—Toward etiology and pathology specificity" Neurobiology of Disease, Elsevier, Amsterdam, NL, vol. 123 (2019); pp. 42-58.
Iwuchukwu et al., "MicroRNA Regulatory Network as Biomarkers of Late Seizure in Patients with Spontaneous Intracerebral Hemorrhage" Molecular Neurbiology, Springer US, NY, vol. 57, No. 5 (2020); pp. 2346-2357.
Partial Supplementary European Search Report for EP Application No. 20770330.7 dated Dec. 8, 2022; 15 pages.
Patent Cooperation Treaty: International Search Report and Written Opinion for PCT/US2020/021896 dated Aug. 20, 2020; 18 pages.
Liu et al., Brain and blood microRNA expression profiling of ischemic stroke, intracerebral hemorrhage, and kainate seizures. J Cereb Blood Flow Metab. 2010, vol. 30(1), p. 92-101.
Sorensen et al., Elevation of brain-enriched mIRNAs in cerebrospinal fluid of patients with acute ischemic stroke. Biomark Res. 2017, vol. 5:24, p. 1-10.
Lee et al., MicroRNAs Induced During Ischemic Preconditioning. Stroke. 2010, vol. 41, p. 1646-1651.
Beltrami et al., Human Pericardial Fluid Contains Exosomes Enriched with Cardiovascular-Expressed MicroRNAs and Promotes Therapeutic Angiogenesis. Mol Ther. 2017, vol. 25(3), p. 679-693.
Song et al., New Hippocampal Model for Examining Intracerebral Hemorrhage-Related Neuronal Death. Stroke. 2007, vol. 38(10), p. 2861-2863.
Bryndziar et al., Seizures Following Ischemic Stroke: Frequency of Occurrence and Impact on Outcome in a Long- Term Population-Based Study. J Stroke Cerebrovasc Dis. 2016, vol. 25(1), p. 150-156.
Kretschmann et al., Different microRNA profiles in chronic epilepsy versus acute seizure mouse models. J. Mol. Neurosci. 2015, vol. 55, p. 466-479.
Abu-Halima et al., Analysis of circulating microRNAs in patients with repaired Tetralogy of Fallot with and without heart failure. J Transl Med. 2017, vol. 15:156. pg 1-13.

* cited by examiner

*Primary Examiner* — Sarae L Bausch
(74) *Attorney, Agent, or Firm* — Schwabe, Williamson & Wyatt, P.C.

(57) ABSTRACT

A method of predicting seizure in a subject that has had an intracerebral hemorrhage, comprising: measuring at least one of miRNA listed in Tables 1A, 1B, 1C and 6-8 in a sample obtained from a subject, wherein the at least one of miRNA comprises at least one of hsa-miR-4325, hsa-miR-181a-5p, hsa-miR-1180-3p, and miR-4317 wherein down regulation of hsa-miR-4325 or hsa-miR-4317 relative to a control indicates the subject will exhibit seizures and wherein upregulation of hsa-miR-181a-5p and hsa-miR-1180-3p, relative to a control indicates the subject will exhibit seizures.

4 Claims, 6 Drawing Sheets

MICRORNA REGULATORY NETWORK AS BIOMARKERS OF SEIZURE IN PATIENTS WITH SPONTANEOUS INTRACEREBRAL HEMORRHAGE

CROSS-REFERENCE TO RELATED APPLICATION

The present application is a national phase entry under 35 U.S.C. § 371 of International Application No. PCT/US2020/021896, filed Mar. 10, 2020, which designates the United States of America, which claims the benefit of the earlier filing date of U.S. Provisional Application No. 62/816,358, filed Mar. 11, 2019, the entire disclosures of each of these applications are hereby incorporated by reference in their entireties and for all purposes.

FIELD

This disclosure relates to methods and compositions for detecting, diagnosing, and treating seizure in a subject with a brain hemorrhage, such as a intracerebral hemorrhage (ICH), in order to prevent, anticipate, and better treat a seizure. Specifically, newly discovered biomarkers, and novel methods for using them, are described.

BACKGROUND

Intracerebral hemorrhage (ICH) accounts for 15-20% of all patients with 'acute stroke' and carries a significant morbidity and mortality of greater than 60% (Sacco et al., Stroke. 2009 February; 40(2):394-9). In addition, 50% of patients who suffer ICH are dependent on others for assistance with activities of daily living for at least one year (Morgenstern et al., Stroke. 2010 September; 41(9):2108-29). ICH carries a large burden to the individual and society with respect to health care cost, lost productivity, and poor quality of life. Acute symptomatic seizures following ICH is a well-known observation and occurs within the 7-10 days after ICH. However, characterization and understanding of long-term seizures following ICH continues to evolve. Recent studies suggest that hemorrhagic strokes, particularly ICH, is associated with a higher risk for long term seizures compared with ischemic stroke. Approximately 15% of patients experience long term seizures after ICH (Gupta et al., Stroke. 1988 December; 19(12):1477-81; Keep et al., Lancet Neurol. 2012 August; 11(8):720-31; Berges et al., Eur Neurol. 2000; 43(1):3-8; Arntz et al., PLoS ONE. 2013; 8(2):e55498; Tanaka et al., PLoS ONE. 2015; 10(8): e0136200; Merkler et al., Stroke. 2018 June; 49(6):1319-24). Age, race but not gender were important factors in long term seizures after ICH (Roberts et al., Age Ageing. 1982 February; 11(1):24-8; Brodie et al., BMJ. 2005 Dec. 3; 331(7528):1317-22; Sung and Chu, Age Ageing. 1990 January; 19(1):25-30.). Etiology of seizures in spontaneous ICH (SICH) is not well-known, but cerebral injury and iron deposition may be contributory factors (Cho, Exp Mol Med. 2011 May 31; 43(5):231-74; Willmore et al., Ann Neurol. 1978 October; 4(4):329-36).

Activation of astrocytes, microglia, and release of proinflammatory and damage associated molecular patterns are recognized pathophysiological processes in ICH. The release of these molecular signatures drives systemic inflammation and mobilize inflammatory cells to the injured brain (Cho, Exp Mol Med. 2011 May 31; 43(5):231-74; Iwuchukwu et al., CNS Neurosci Ther. 2016; 22(12):1015-8). A similar pattern is observed in traumatic brain injury and subsequent development of posttraumatic epilepsy (Keep et al., Lancet Neurol. 2012 August; 11(8):720-31; Cho, Exp Mol Med. 2011 May 31; 43(5):231-74; Diamond et al., Epilepsia. 2015 August; 56(8):1198-206; Annegers and Coan, Seizure. 2000 October; 9(7):453-7). Despite increasing knowledge of the role of inflammatory pathways in posttraumatic epilepsy (Musto et al., Sci Rep. 2016 22; 6:30298; Musto et al., PLoS ONE. 2015; 10(1):e0116543; Musto et al., Epilepsia. 2011 September; 52(9):1601-8), temporal lobe epilepsy, and status epilepticus; the relationship of these molecular pathways in epileptogenesis after ICH is largely unknown.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Terms

Figure 1:
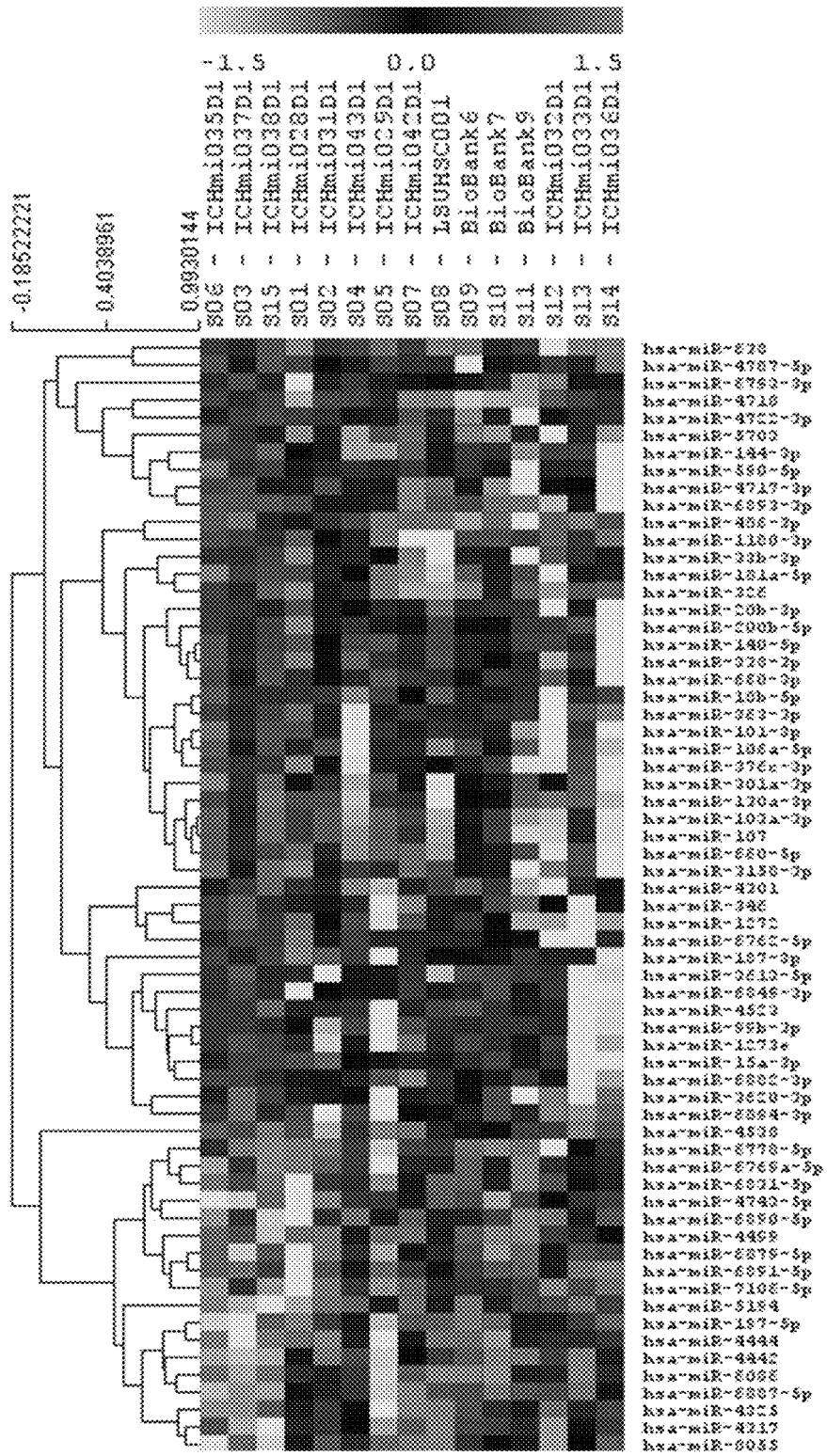
FIG. 1 is a heatmap hierarchal cluster of the top significantly expressed miRNAs in Seizure ICH vs nonSeizure ICH and normal. Heat map of 64 significant miRNA ($p<0.05$) were found: 15 highly expressed and 49 with low expression.

In the following detailed description, reference is made to the accompanying drawings that form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, technical terms are used according to conventional usage. Definitions of common terms in molecular biology can be found in Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); and Robert A. Meyers (ed.), Molecular Biology and Biotechnology: a Comprehensive Desk Reference, published by VCH Publishers, Inc., 1995 (ISBN 9780471185710); and other similar references.

Suitable methods and materials for the practice or testing of this disclosure are described below. Such methods and materials are illustrative only and are not intended to be limiting. Other methods and materials similar or equivalent to those described herein can be used. For example, conventional methods well known in the art to which this disclosure pertains are described in various general and more specific references, including, for example, Sambrook et al., *Molecular Cloning: A Laboratory Manual, 2d ed.*, Cold Spring Harbor Laboratory Press, 1989; Sambrook et al., *Molecular Cloning: A Laboratory Manual*, 3d ed., Cold Spring Harbor Press, 2001; Ausubel et al., *Current Protocols in Molecular Biology*, Greene Publishing Associates, 1992 (and Supplements to 2000); Ausubel et al., *Short Protocols in Molecular Biology: A Compendium of Methods from Current Protocols in Molecular Biology*, 4th ed., Wiley & Sons, 1999; Harlow and Lane, *Antibodies: A Laboratory Manual*, Cold Spring Harbor Laboratory Press, 1990; and *Harlow and Lane, Using Antibodies: A Laboratory Manual*, Cold Spring Harbor Laboratory Press, 1999. In addition, the materials, methods, and examples are illustrative only and not intended to be limiting.

To facilitate review of the various embodiments of the disclosure, the following explanations of specific terms are provided:

Administration: To provide or give a subject an agent, such as a therapeutic agent, by any effective route. Exemplary routes of administration include, but are not limited to, injection (such as subcutaneous, intramuscular, intradermal, intraperitoneal, and intravenous), oral, intraductal, sublingual, rectal, transdermal, intranasal, and inhalation routes.

Agent: Any protein, nucleic acid molecule (including chemically modified nucleic acids), compound, small molecule, organic compound, inorganic compound, or other molecule of interest. Agent can include a therapeutic agent, a diagnostic agent or a pharmaceutical agent. A therapeutic or pharmaceutical agent is one that alone or together with an additional compound induces the desired response (such as inducing a therapeutic or prophylactic effect when administered to a subject, including inhibiting or treating a seizure). In some examples, the therapeutic agent includes an isolated microRNA (miRNA) that is down-regulated in patients with a brain hemorrhage, such as an intracerebral hemorrhage (ICH).

Alteration in expression: An alteration in expression of a miRNA gene product refers to a change or difference, such as an increase or decrease, in the level of the miRNA gene product, that is detectable in a biological sample (such as a sample from subject, for example blood sample or fraction thereof), for example relative to a control, such as a subject that has not suffered an ICH. An "alteration" in expression includes an increase in expression (up-regulation) or a decrease in expression (down-regulation). In some examples, an alteration in expression includes a change or difference, such as an increase or decrease, in the conversion of the information encoded in a miRNA gene into miRNA gene product. In some examples, the difference is relative to a control or reference value, such as an amount of miRNA expression in a sample from a healthy control subject.

Antisense compound: An oligomeric compound that is at least partially complementary to the region of a target nucleic acid molecule (such as a miRNA) to which it hybridizes. As used herein, an antisense compound that is "specific for" a target nucleic acid molecule is one which specifically hybridizes with and modulates expression of the target nucleic acid molecule. As used herein, a "target" nucleic acid is a nucleic acid molecule to which an antisense compound is designed to specifically hybridize and modulate expression. In some examples, the target nucleic acid molecule is a miRNA gene product.

Nonlimiting examples of anti sense compounds include primers, probes, antisense oligonucleotides, siRNAs, miRNAs, shRNAs and ribozymes. As such, these compounds can be introduced as single-stranded, double-stranded, circular, branched or hairpin compounds and can contain structural elements such as internal or terminal bulges or loops. Double-stranded antisense compounds can be two strands hybridized to form double-stranded compounds or a single strand with sufficient self-complementarity to allow for hybridization and formation of a fully or partially double-stranded compound. In particular examples herein, the antisense compound is an antisense oligonucleotide, siRNA or ribozyme.

In some examples, an antisense compound is an "antisense oligonucleotide." An antisense oligonucleotide is a single-stranded antisense compound that is a nucleic acid-based oligomer. An antisense oligonucleotide can include one or more chemical modifications to the sugar, base, and/or internucleoside linkages. Generally, antisense oligonucleotides are "DNA-like" such that when the antisense oligonucleotide hybridizes to a target RNA molecule, the duplex is recognized by RNase H (an enzyme that recognizes DNA:RNA duplexes), resulting in cleavage of the RNA.

In some embodiments an antisense compound is an miRNA mimic, for example to replenish the loss of such miRNA to reestablish control of gene regulation. Inhibitors of miRNAs are also contemplated.

Array: An arrangement of molecules, such as biological macromolecules (such nucleic acid molecules, for example probes), in addressable locations on or in a substrate. A "microarray" is an array that is miniaturized so as to require or be aided by microscopic examination for evaluation or analysis. Arrays are sometimes called DNA chips or biochips.

The array of molecules ("features") makes it possible to carry out a very large number of analyses on a sample at one time. In certain example arrays, one or more molecules (such as an oligonucleotide probe) will occur on the array a plurality of times (such as twice), for instance to provide internal controls. The number of addressable locations on the array can vary, for example from at least 2, at least 5, at least 10, at least 14, at least 15, at least 20, at least 30, at least 50, at least 75, at least 100, at least 150, at least 200, at least 300, at least 500, least 550, at least 600, at least 800, at least 1000, at least 10,000, or more. In a particular example, an array includes 5-1000 addressable locations, such as 10-100 addressable locations. In particular examples, an array consists essentially of probes or primers (such as those that permit amplification) specific for the miRNA gene products discussed herein.

Within an array, each arrayed sample is addressable, in that its location can be reliably and consistently determined within at least two dimensions of the array. The feature application location on an array can assume different shapes. For example, the array can be regular (such as arranged in uniform rows and columns) or irregular. Thus, in ordered arrays the location of each sample is assigned to the sample at the time when it is applied to the array, and a key may be provided in order to correlate each location with the appropriate target or feature position. Often, ordered arrays are arranged in a symmetrical grid pattern, but samples could be arranged in other patterns (such as in radially distributed lines, spiral lines, or ordered clusters). Addressable arrays usually are computer readable, in that a computer can be programmed to correlate a particular address on the array with information about the sample at that position (such as hybridization or binding data, including for instance signal intensity). In some examples of computer readable formats, the individual features in the array are arranged regularly, for instance in a Cartesian grid pattern, which can be correlated to address information by a computer.

Biological sample: A biological specimen containing genomic DNA, RNA (including mRNA and microRNA), protein, or combinations thereof, obtained from a subject. Examples include, but are not limited to, saliva, peripheral blood, urine, tissue biopsy, surgical specimen, and autopsy material. In embodiments, the biological sample is a bodily fluid, such as blood, or a component thereof, such as plasma or serum.

cDNA (complementary DNA): A piece of DNA lacking internal, non-coding segments (introns) and regulatory sequences which determine transcription. cDNA can be synthesized by reverse transcription from RNA extracted from cells.

Contacting: Placement in direct physical association, including both a solid and liquid form. Contacting an agent with a cell can occur in vitro by adding the agent to isolated cells or in vivo by administering the agent to a subject.

Control: A "control" refers to a sample or standard used for comparison with a test sample, such as a sample obtained from a subject or patient (or plurality of patients). In some embodiments, the control is a sample obtained from a healthy patient (or plurality of patients) (also referred to herein as a "normal" control). In some embodiments, the control is a historical control or standard value (e.g. a previously tested control sample or group of samples that represent baseline or normal values, such as baseline or normal values in a normal subject or subject in which does not have an ICH). In some examples the control is a standard value representing the average value (or average range of values) obtained from a plurality of patient samples (such as an average value or range of values of miRNA expression from normal patients).

Decrease or downregulate: To reduce the quality, amount, or strength of something. In some examples, when used in reference to the expression of nucleic acid molecules (such as a miRNA), a reduction or downregulation refers to any process which results in a decrease in production of a gene product. Gene downregulation includes any detectable decrease in the production of a gene product. In certain examples, production of a miRNA, or a decreases by at least 2-fold, at least 3-fold, at least 4-fold, at least 5-fold, at least 6-fold, at least 8-fold, at least 10-fold, at least 15-fold, at least 20-fold, at least 30-fold or at least 40-fold, as compared to a control.

Diagnosis: The process of identifying a disease by its signs, symptoms and/or results of various tests. The conclusion reached through that process is also called "a diagnosis." Forms of testing commonly performed include blood tests, medical imaging, genetic analysis, urinalysis, biopsy and the methods disclosed herein.

Diagnostically significant amount: As used herein a "diagnostically significant amount" refers to an increase or decrease in the level of a miRNA gene product or ratio thereof in a biological sample that is sufficient to allow one to distinguish one patient population from another (such as a subject suffering having a predisposition to the development of a seizure from one that is not). In some embodiments, the diagnostically significant increase or decrease is at least 2-fold, at least 3-fold, at least 4-fold, at least 5-fold, at least 6-fold, at least 8-fold, at least 10-fold, at least 15-fold, at least 20-fold, at least 30-fold or at least 40-fold relative to a control. In some embodiments, the diagnostically significant increase or decrease is at least 2-fold, at least 3-fold, at least 4-fold, at least 5-fold, at least 6-fold, at least 8-fold, at least 10-fold, at least 15-fold, at least 20-fold, at least 30-fold or at least 40-fold change in the ratio of two or more biomarkers relative to a control.

Effective amount: An amount of agent that is sufficient to generate a desired response, such as reducing or inhibiting one or more signs or symptoms associated with a condition or disease. When administered to a subject, a dosage will generally be used that will achieve target tissue concentrations. In some examples, an "effective amount" is one that treats one or more symptoms and/or underlying causes of any of a disorder or disease.

Measuring the level of expression: As used herein, measuring the level of expression of a particular miRNA refers to quantifying the amount of the miRNA present in a sample. Quantification can be either numerical or relative. Detecting expression of the miRNA can be achieved using any method known in the art or described herein, such as by RT-PCR, digital PCR or transcript counting method such the NCounter® Analysis Technology as available from Nanostring Technologies. Other examples of detecting expression include, synthetic or cell-free biological devices, such as described by Pardee et al., (Cell 2014 Nov. 6; 159(4):940-54). Detecting expression of a miRNA includes detecting expression of either a mature form of the miRNA or a precursor form (i.e., a pri-miRNA or pre-miR) that is correlated with expression of the miRNA. Typically, miRNA detection methods involve sequence specific detection, such as by RT-PCR. miRNA-specific primers and probes can be designed using the precursor and mature miRNA nucleic acid sequences that are known in the art and disclosed herein.

In embodiments, the change detected is an increase or decrease in expression as compared to a control, such as a reference value or a healthy control subject. In some examples, the detected increase or decrease is an increase or decrease of at least two-fold compared with the control or standard. Controls or standards for comparison to a sample, for the determination of differential expression, include samples believed to be normal as well as laboratory values (e.g., range of values), even though possibly arbitrarily set, keeping in mind that such values can vary from laboratory to laboratory.

Label: An agent capable of detection, for example by ELISA, spectrophotometry, flow cytometry, or microscopy. For example, a label can be attached to a nucleic acid molecule or protein (indirectly or directly), thereby permitting detection of the nucleic acid molecule or protein. Examples of labels include, but are not limited to, radioactive isotopes, enzyme substrates, co-factors, ligands, chemiluminescent agents, fluorophores, haptens, enzymes, and combinations thereof. Methods for labeling and guidance in the choice of labels appropriate for various purposes are discussed for example in Sambrook et al. (Molecular Cloning: A Laboratory Manual, Cold Spring Harbor, New York, 1989) and Ausubel et al. (In Current Protocols in Molecular Biology, John Wiley & Sons, New York, 1998).

Primer: a short nucleic acid molecule, for instance DNA oligonucleotides 10-100 nucleotides in length, such as 5, 6, 7, 8, 9, 10, 11, 12, or more in length. Primers can be annealed to a complementary target nucleic acid strand by nucleic acid hybridization to form a hybrid between the primer and the target nucleic acid strand. Primers can be used for amplification of a nucleic acid sequence, such as by PCR or other nucleic acid amplification methods known in the art.

Probe: A short sequence of nucleotides, such as at least 8, at least 10, at least 15, at least 20, or at least 21 nucleotides in length, used to detect the presence of a complementary sequence by molecular hybridization. In particular examples, oligonucleotide probes include a label that permits detection of oligonucleotide probe:target sequence hybridization complexes. Laboratory standards and values can be set based on a known or determined population value and can be supplied in the format of a graph or table that permits comparison of measured, experimentally determined values.

MicroRNA (miRNA or miR): A single-stranded RNA molecule that regulates gene expression in plants, animals and viruses. A gene encoding a microRNA is transcribed to form a primary transcript microRNA (pri-miR), which is processed to form a short stem-loop molecule, termed a precursor microRNA (pre-miR), followed by endonucleolytic cleavage to form the mature microRNA. Mature microRNAs are approximately 21-23 nucleotides in length and are partially complementary to the 3'UTR of one or more target messenger RNAs (mRNAs). The term "microRNA gene product" includes pri-miRs, pre-miRs and mature microRNAs (including minor mature miRNA species referred to as miR*). MicroRNAs modulate gene expression by promoting cleavage of target mRNAs or by blocking translation of the cellular transcript.

MicroRNAs can modulate gene expression by promoting cleavage of target mRNAs or by blocking translation of the cellular transcript. As new microRNAs are identified, researchers register the sequences prior to publication of their work to ensure that each unique microRNA is assigned an official number (the miRBase Registry is available online through the University of Manchester at www.mirbase.org), eliminating any ambiguity in the literature regarding the identity of particular microRNAs. All miRs referred to by their miRBase registry numbers are herein incorporated by reference as they appear in the miRBase registry as of the filing date of this application. The miRBase registry also provides sequence information for known miRs.

Patient or Subject: A term that includes human and non-human animals, such as those having suffered an ICH. In one example, the patient or subject is a mammal, such as a human. "Patient" and "subject" are used interchangeably herein.

Pharmaceutically acceptable vehicles: The pharmaceutically acceptable carriers (vehicles) useful in this disclosure are conventional. Remington's Pharmaceutical Sciences, by E. W. Martin, Mack Publishing Co., Easton, PA, 19th Edition (1995), describes compositions and formulations suitable for pharmaceutical delivery of one or more therapeutic compounds, molecules or agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Small interfering RNA (siRNA): A double-stranded nucleic acid molecule that modulates gene expression through the RNAi pathway (see, for example, Bass, Nature 411:428-9, 2001; Elbashir et al., Nature 411:494-8, 2001; and PCT Publication Nos. WO 00/44895; WO 01/36646; WO 99/32619; WO 00/01846; WO 01/29058; WO 99/07409; and WO 00/44914). siRNA molecules are generally 20-25 nucleotides in length with 2-nucleotide overhangs on each 3' end. However, siRNAs can also be blunt ended. Generally, one strand of a siRNA molecule is at least partially complementary to a target nucleic acid, such as a target miRNA. siRNAs are also referred to as "small inhibitory RNAs," "small interfering RNAs" or "short inhibitory RNAs." As used herein, siRNA molecules need not be limited to those molecules containing only RNA, but further encompasses chemically modified nucleotides and non-nucleotides having RNAi capacity or activity. In an example, a siRNA molecule is one that reduces or inhibits the biological activity or expression of a miRNA gene product.

Treating a disease: A phrase referring to a therapeutic intervention that ameliorates a sign or symptom of a disease or pathological condition after it has begun to develop.

Upregulated or activated: When used in reference to the expression of a nucleic acid molecule (such as a miRNA), refers to any process which results in an increase in production of a gene product. In the context of the present disclosure, a gene product can be a primary transcript ncRNA, precursor ncRNA, or a mature ncRNA, such as a miRNA. Gene upregulation or activation includes any detectable increase in any of these molecules. In certain examples, production of a ncRNA such as a miRNA increases by at least 2-fold, at least 3-fold, at least 4-fold, at least 5-fold, at least 6-fold, at least 8-fold, at least 10-fold, at least 15-fold, at least 20-fold, at least 30-fold or at least 40-fold, as compared to a control.

Stroke: A medical condition in which poor blood flow to the brain results in cell death. There are two main types of stroke: ischemic, due to lack of blood flow, and hemorrhagic, due to bleeding. The two types of hemorrhagic strokes are intracerebral (within the brain) hemorrhage or subarachnoid hemorrhage. Subarachnoid hemorrhage (SAH) is bleeding into the subarachnoid space—the area between the arachnoid membrane and the pia mater surrounding the brain. SAH may occur as a result of a head injury or spontaneously, usually from a ruptured cerebral aneurysm. Spontaneous SAH occurs in about one per 10,000 people per year and comprises about 5 percent of all strokes. Intracerebral hemorrhage (ICH): is bleeding within the brain tissue itself. ICH makes up roughly 5% of the strokes.

Overview of Several Embodiments

The predominance, severity, and progression of a pathological process are under genetic modulation following tissue injury. Gene expression profiling of tissues from human and experimental models of ICH have identified genes that may be implicated in the patho-biological processes following ICH (Zheng et al., CNS Neurosci Ther. 2012 December; 18(12):1003-11; Rosell et al., PLoS ONE. 2011 Feb. 2; 6(2):e16750'; Yang et al., Mol Med Rep. 2014 October; 10(4):1671-8). miRNAs are noncoding RNA about 22 nucleotides in length and are important in post-transcriptional regulation of gene expression and are increasingly recognized as potential biomarkers in cancer, cardiac, and autoimmune diseases (Chen et al., Cell Res. 2008 October; 18(10):997-1006; Reid et al., Crit Rev Oncol Hematol. 2011 November; 80(2):193-208). Their role in neurological diseases is increasingly recognized (Zheng et al., CNS Neurosci Ther. 2012 December; 18(12):1003-11; Sørensen S et al., Transl Stroke Res. 2014 December; 5(6):711-8; Liu et al., J Cereb Blood Flow Metab. 2010 January; 30(1):92-101). miRNA regulate multiple genes and likely alter biological processes in a given physiological or disease state. There are variations in miRNA expression patterns in different neurological diseases hence, miRNA expression patterns likely shed light on important biological processes that are of significance to clinical events or outcomes (Iwuchukwu et al., CNS Neurosci Ther. 2016; 22(12):1015-8; Zheng et al., CNS Neurosci Ther. 2012 December; 18(12):1003-11; Rosell et al., PLoS ONE. 2011 Feb. 2; 6(2):e16750; Yang et al., Mol Med Rep. 2014 October; 10(4):1671-8; Sørensen et al., Transl Stroke Res. 2014 December; 5(6):711-8; Liu et al., J Cereb Blood Flow Metab. 2010 January; 30(1):92-101; Cannon et al., Int J Stroke. 2007 November; 2(4):265-9).

As disclosed herein, the inventors have determined differences in miRNA and mRNA levels in peripheral whole blood of post-ICH patients with long term seizures at 1-year, post-ICH patients without long term seizures at 1 year and healthy controls. The results presented herein identify known mature miRNA, mRNA targets and miRNA-mRNA regulatory networks that may serve as biomarkers and therapeutic targets in the management of patients with post-ICH seizures.

As disclosed herein, a significantly greater number of upregulated miRNAs were identified as compared to downregulated miRNAs in post-ICH seizures than in non-seizure ICH plus healthy control samples. Furthermore, the magnitude of change (i.e. fold-change) were small for all these significantly expressed miRNA. When miRNA distributions were compared among the three groups, 6 miRNA were identified that distinguish post-ICH seizures from normal, 4 miRNA that are unique to seizure, and 11 that distinguish seizure from NonSeizure and Normal.

Methods of Predicting Seizure

As disclosed herein the differential level of expression of the miRNAs as disclosed in the Tables 1A, 1B, 1C and 6-8 below can be used to diagnose a predisposition for a seizure, for example after a brain hemorrhage, such as an intracerebral hemorrhage. Thus, provided herein is a method that includes measuring at least one of miRNAs listed in Tables 1A, 1B, 1C and 6-8 in a sample obtained from a subject, such as a blood sample, e.g. whole blood or a fraction thereof. In embodiments, at least one of the miRNAs comprise at least one of hsa-miR-4325, hsa-miR-181a-5p, hsa-miR-1180-3p, and miR-4317. In embodiments, the method further includes selecting a subject with, or believed to have, suffered an intracerebral hemorrhage. In embodiments, the method is used for diagnosing or prognosis of seizure in a subject that has suffered an intracerebral hemorrhage (ICH). measuring at least one of miRNA listed in Tables 1A, 1B, 1C and 6-8 in a sample obtained from a subject. In embodiments, the method includes measuring at least one of hsa-miR-4325, hsa-miR-181a-5p, hsa-miR-1180-3p, and miR-4317 wherein down regulation of hsa-miR-4325 or hsa-miR-4317 relative to a control indicates the subject will exhibit seizures and wherein upregulation of hsa-miR-181a-5p and hsa-miR-1180-3p, relative to a control indicates the subject will exhibit seizures. In embodiments, the method includes measuring at least one of hsa-miR-6893-3p, hsa-miR-346, hsa-miR-200b-5p, hsa-miR-335-3p, hsa-miR-206, hsa-miR-3126-3p, wherein down regulation of hsa-miR-200b-5p, hsa-miR-335-3p, or hsa-miR-206 relative to a control indicates the subject will exhibit seizures and wherein upregulation of hsa-miR-6893-3p, hsa-miR-346, or hsa-miR-3126-3p relative to a control indicates the subject will exhibit seizures. In embodiments, the method includes measuring at least one of hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, wherein upregulation of hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, relative to a control indicates the subject will exhibit seizures.

In embodiments, the at least one miRNAs further comprises one or more of hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4'78'7-5p, wherein upregulation of hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, relative to a control indicative of non-seizure indicates the subject will exhibit seizure.

In embodiments, the at least one miRNAs further comprises one or more of hsa-miR-625-5p, hsa-miR-6893-3p, hsa-miR-346, hsa-miR-200b-5p, hsa-miR-335-3p, hsa-miR-206 or hsa-miR-3126-3p, wherein upregulation of hsa-miR-6893-3p, hsa-miR-346, hsa-miR-200b-5p, or hsa-miR-3126-3p relative to a control indicative of normal indicates the subject will exhibit seizure and wherein downregulation of hsa-miR-625-5p, hsa-miR-335-3p, or hsa-miR-206 relative to a control indicative of normal indicates the subject will exhibit seizure.

In embodiments, the at least one miRNAs further comprises one or more of hsa-miR-625-5p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-686'7-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p wherein upregulation of hsa-miR-4492, hsa-miR-4508, hsa-miR-4707-5p, hsa-miR-4488, hsa-miR-1273g-3p, hsa-miR-6794-3p, hsa-miR-663a, hsa-miR-4718, hsa-miR-1258, hsa-miR-3194-3p, hsa-miR-1231, hsa-miR-3917, hsa-miR-3180, hsa-miR-154-5p, hsa-miR- or 1273e relative to a control indicative of normal indicates the subject will exhibit no seizure and wherein downregulation of hsa-miR-625-5p, hsa-let-7d-5p, hsa-let-7a-5p, hsa-let-7f-5p, hsa-miR-98-5p, hsa-miR-144-5p, hsa-miR-576-5p, hsa-miR-374c-5p, hsa-miR-3613-5p, hsa-miR-6809-5p, hsa-miR-629-5p, hsa-miR-1468-5p, hsa-miR-6867-5p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-99b-3p, hsa-miR-1285-5p, hsa-miR-20b-3p, hsa-miR-6847-5p, or hsa-miR-6506-3p relative to a control indicative of normal indicates the subject will exhibit no seizure.

In embodiments, the method includes comparing the expression of one or more of comparing the expression of one or more of miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p to a control.

In embodiments, the expression of expression miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p is detected with a probe and/or primers that respectively specifically bind to expression miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p, or an amplification product thereof. In embodiments, the probe and/or primers are labeled with a detectable label. In embodiments the expression of one or more of expression miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p is measured.

In some embodiments of the methods, the diagnostically significant increase or decrease in expression of the miRNA gene product is at least a 1.1-fold, 1.2-fold, 1.3-fold, 1.4-fold, 1.5-fold, 2-fold, 3-fold, 4-fold, 5-fold, 10-fold increase or decrease, for example relative to the level of a control. In some example the ratio of one miRNA to another miRNA is at least 1.1, 1.2, 1.3, 1.4, 1.5, 2, 3, 4, 5, 6, 7, 8, 9, 10, 15, 20, 30, 50, 60, 70, 80, 100, or even greater. Thus in some embodiments, the ratio of the one miRNA to the another miRNA of at least 1.1, 1.2, 1.3, 1.4, 1.5, 2, 3, 4, 5, 6, 7, 8, 9, 10, 15, 20, 30, 50, 60, 70, 80, 100, or even greater is used as a control threshold, above which a predisposition to seizure is diagnosed or detected.

In addition methods are disclosed herein may be used to find other biomarkers to predict and/or detect seizure in a subject that has suffered a brain hemorrhage, such as ICH. Comparing absolute or relative concentrations of miRNAs in the serum is complicated by differing blood volumes in subjects. To overcome this, normalization strategies may be used to determine the relative concentration (ratio) of one miRNA of interest to another. In this method, normalized cycle threshold ($\Delta C_t$) is calculated by one of the methods below. A direct ratio of two miRNAs of interest may be determined using the equation: $\Delta C_t = C_{t,G1} - C_{t,G2}$.

Where:

$C_{t,G1}$=Cycle threshold for ncRNA of interest 1; and
$C_{t,G2}$=Cycle threshold for ncRNA of interest 2.

Normalized ratios may be determined using the equation:
$\Delta C_t = (C_{t,G1} - C_{t,HK1}) - (C_{t,G2} - C_{t,HK2})$.

Where:

$C_{t,G1}$=Cycle threshold for miRNA of interest 1;
$C_{t,G2}$=Cycle threshold for miRNA of interest 2;
$C_{t,HK1}$=Cycle threshold for spike-in control RNA 1; and
$C_{t,HK2}$=Cycle threshold for spike-in control RNA 2.

The fold difference between the test $\Delta C_t$ and a $\Delta C_t$ for the control sample may be determined using the equation: Fold difference=$2^{-(\Delta Ct_{test} - \Delta Ct_{control})}$.

Methods of detecting and measuring miRNA expression are known in the art and are described in detail below. In some examples, RT-PCR is used to measure the level of a miRNA, such as when a single miRNA is analyzed. In other cases, when multiple miRNA gene products are to be measured, it may be desirable to use microarray analysis.

The miRNA gene product measured can be a primary miRNA (pri-miR) precursor miRNA (pre-miR), or a mature miRNA (including minor mature miRNA products denoted miR*).

In some embodiments of the methods, the biological sample is blood, or a component thereof, such as plasma or serum. In some examples the biological sample is cerebrospinal fluid. Thus, the method in some examples includes obtaining an appropriate sample from the patient to be diagnosed or treated with the methods provided herein.

In some embodiments, the method further includes providing an appropriate therapy for the subject diagnosed with a predisposition to seizure, such a subject that has had or is suspected of having brain hemorrhage, such as ICH. In some examples, the therapy includes administering an isolated miRNA gene product, such a miRNA gene product that has been identified as down-regulated in the subject relative to a control. In some examples, the therapy includes administering an agent that inhibits expression of a miRNA gene product, such as an agent that inhibits a miRNA gene product identified as up-regulated in the subject. In other examples, the therapy includes administering an agent that reduces seizure in the subject. In some embodiments, the therapy includes surgical intervention or a recommendation of such intervention as known in the art.

In some embodiments, the method includes selecting a subject with, or believed to have, suffered an intracerebral hemorrhage. In some embodiments, the method is used for diagnosing or prognosing a subject that has suffered an intracerebral hemorrhage. In some embodiments, the method includes selecting a subject with, or believed to have, suffered a brain hemorrhage, such as an intracerebral hemorrhage.

In some embodiments, once a patient's diagnosis is determined, an indication of that diagnosis can be displayed and/or conveyed to a clinician or other caregiver. For example, the results of the test are provided to a user (such as a clinician or other health care worker, laboratory personnel, or patient) in a perceivable output that provides information about the results of the test. In some examples, the output is a paper output (for example, a written or printed output), a display on a screen, a graphical output (for example, a graph, chart, voltammetric trace, or other diagram), or an audible output. In other examples, the output is a numerical value, such as an amount of miRNA expression in the sample or a relative amount of miRNA in the sample as compared to a control. In some examples the numerical value is the ratio of expression of one or more miRNAs to one or more other miRNAs. In additional examples, the output is a graphical representation, for example, a graph of the expression and/or ratio of expression on a standard curve or ROC. In a particular example, the output (such as a graphical output) shows or provides a cut-off value or level that indicates the predisposition for seizures. In some examples, the output is communicated to the user, for example by providing an output via physical, audible, or electronic means (for example by mail, telephone, facsimile transmission, email, or communication to an electronic medical record). The output can provide quantitative information. In some examples, the output is accompanied by guidelines for interpreting the data, for example, numerical or other limits that indicate the predisposition for seizures. The guidelines need not specify whether a subject will suffer a seizure, although it may include such a diagnosis. The output can, for example, include normal or abnormal ranges or a cutoff, which the recipient of the output may then use to interpret the results, for example, to arrive at a diagnosis, prognosis, or treatment plan. In other examples, the output can provide a recommended therapeutic regimen. In some examples, the test may include determination of other clinical information.

In some embodiments, the disclosed methods of diagnosis include one or more of the following depending on the patient's diagnosis: a) prescribing a treatment regimen for the patient if the patient's determined diagnosis is considered to have a predisposition for seizures; b) not prescribing a treatment regimen for the patient if the patient's determined diagnosis is considered to be negative for a predisposition for seizures; c) administering a treatment to the patient if the patient's determined diagnosis is considered to be positive for a predisposition for seizures; and d) not administering a treatment regimen to the patient if the patient's determined diagnosis is considered to be negative for a predisposition for seizures. In an alternative embodiment, the method can include recommending one or more of a)-d). Thus, disclosed is a method of treating a predisposition for seizures in a subject.

Kits and Assays

Also provided are kits and assays including at least two oligonucleotide probes and/or primers specific for a miRNA gene product, such as those described herein. In some embodiments, the probes and/or primers are labeled, with a detectable label. In some embodiments, the kits and assays include at least two oligonucleotide probes specific for miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p. In some examples, the kits and assays include controls (such as positive and negative controls). In some examples the probes and/or primers are present in an array.

In some embodiments, the kits and assays include instructions for the use thereof. In embodiments, the probes are present in an array.

Detecting miRNA Expression

As described below, expression of one or more miRNAs associated with seizures in a subject that has suffered brain hemorrhage, such as ICH, can be detected using any one of a number of methods well known in the art. In some embodiments of the methods provided herein, miRNAs expression profiles are used to diagnose to predict the prognosis of seizure and develop potential therapies for patients that may suffer from seizer after an intracerebral hemorrhage, such as ICH. Thus, the disclosed methods can include evaluating miRNAs, such as miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p.

The sequences of precursor miRNAs are publicly available, such as through the miRBase database, available online by the University of Manchester, and formerly maintained by the Sanger Institute (see Griffiths-Jones et al., *Nucleic Acids Res.* 36:D154-D158, 2008; Griffiths-Jones et al., *Nucleic Acids Res.* 34:D140-D144, 2006; and Griffiths-Jones, *Nucleic Acids Res.* 32:D109-D111, 2004) and GEN-BANK®.

Any one of a number of methods for detecting expression of a gene of interest (including miRNA) known in the art can be used to detect expression of a miRNA. A number of these methods, including qRT-PCR, array, microarray, SAGE are described in further detail below. Detection and quantification of miRNA expression can be achieved by any one of a number of methods known in the art including those described herein. U.S. Patent Application Publication Nos. 2006/0211000 and 2007/0299030 describe methods of miRNA detection and quantification. Further, general methods for RNA extraction are well known in the art and are disclosed in standard textbooks of molecular biology, including Ausubel et al., Current Protocols of Molecular Biology, John Wiley and Sons (1997). Using the known sequences for a miRNA of interest, specific probes and primers can be designed for use in the detection methods described herein as appropriate.

In some cases, the miRNA detection method requires isolation of nucleic acid from a sample, such as a blood, for example a serum sample. Nucleic acids, including RNA and specifically miRNA, can be isolated using any suitable technique known in the art.

Microarray analysis of miRNA can be accomplished according to any method known in the art (see, for example, PCT Publication No. WO 2008/054828; Ye et al., Nat. Med. 9(4):416-423, 2003; Calin et al., N. Engl. J. Med. 353(17): 1793-1801, 2005). In one example, RNA is extracted from a sample, the small RNAs (18-26-nucleotide RNAs) are size-selected from total RNA using denaturing polyacrylamide gel electrophoresis. Oligonucleotide linkers are attached to the 5' and 3' ends of the small RNAs and the resulting ligation products are used as templates for an RT-PCR reaction with 10 cycles of amplification. The sense strand PCR primer has a fluorophore attached to its 5' end, thereby fluorescently labeling the sense strand of the PCR product. The PCR product is denatured and then hybridized to the microarray. A PCR product, referred to as the target nucleic acid that is complementary to the corresponding miRNA capture probe sequence on the array will hybridize, via base pairing, to the spot at which the capture probes are affixed. The spot will then fluoresce when excited using a microarray laser scanner. The fluorescence intensity of each spot is then evaluated in terms of the number of copies of a particular miRNA, using a number of positive and negative controls and array data normalization methods, which will result in assessment of the level of expression of a particular miRNA.

In an alternative method, total RNA containing miRNA extracted from a cell, biological fluid or tissue sample is used directly without size-selection of small RNAs, and 3' end labeled using T4 RNA ligase and either a fluorescently-labeled short RNA linker. The RNA samples are labeled by incubation at 30° C. for 2 hours followed by heat inactivation of the T4 RNA ligase at 80° C. for 5 minutes. The fluorophore-labeled miRNAs complementary to the corresponding miRNA capture probe sequences on the array will hybridize, via base pairing, to the spot at which the capture probes are affixed. The microarray scanning and data processing is carried out.

Methods for quantitating RNA, including miRNA, are well known in the art. In some embodiments, the method utilizes RT-PCR. Generally, the first step in gene expression profiling by RT-PCR is the reverse transcription of the RNA template into cDNA, followed by its exponential amplification in a PCR reaction. Two commonly used reverse transcriptases are avian myeloblastosis virus reverse transcriptase (AMV-RT) and Moloney murine leukemia virus reverse transcriptase (MMLV-RT). However, any suitable reverse transcriptase known in the art can be used for RT-PCR. The reverse transcription step is typically primed using specific primers, random hexamers, or oligo-dT primers, depending on the circumstances and the goal of expression profiling. For example, extracted RNA can be reverse-transcribed using a GeneAmp RNA PCR kit (Perkin Elmer, CA), following the manufacturer's instructions. The derived cDNA can then be used as a template in the subsequent PCR reaction.

Although the PCR step can use a variety of thermostable DNA-dependent DNA polymerases, it often employs the Taq DNA polymerase, which has a 5'-3' nuclease activity but lacks a 3'-5' proofreading endonuclease activity. TaqMan® PCR typically utilizes the 5'-nuclease activity of Taq or Tth DNA polymerase to hydrolyze a hybridization probe bound to its target amplicon, but any enzyme with equivalent 5' nuclease activity can be used. Two oligonucleotide primers are used to generate an amplicon typical of a PCR reaction. A third oligonucleotide, or probe, is designed to detect nucleotide sequence located between the two PCR primers. The probe is non-extendible by Taq DNA polymerase enzyme, and is labeled with a reporter fluorescent dye and a quencher fluorescent dye. Any laser-induced emission from the reporter dye is quenched by the quenching dye when the two dyes are located close together as they are on the probe. During the amplification reaction, the Taq DNA polymerase enzyme cleaves the probe in a template-dependent manner. The resultant probe fragments disassociate in solution, and signal from the released reporter dye is free from the quenching effect of the second fluorophore. One molecule of reporter dye is liberated for each new molecule synthesized, and detection of the unquenched reporter dye provides the basis for quantitative interpretation of the data.

To minimize errors and the effect of sample-to-sample variation, RT-PCR can be performed using an internal standard. The ideal internal standard is expressed at a constant level among different tissues, and is unaffected by the experimental treatment. RNAs commonly used to normalize patterns of gene expression are mRNAs for the housekeeping genes glyceraldehyde-3-phosphate-dehydrogenase (GAPDH), beta-actin, and 18S ribosomal RNA.

Primers that can be used to amplify a particular miRNA can be designed and synthesized according to well-known methods using publically available sequences of the miRNA as well as those provided herein.

SAGE is another method that allows the simultaneous and quantitative analysis of a large number of gene transcripts, without the need of providing an individual hybridization probe for each transcript. First, a short sequence tag (about 10-14 base pairs) is generated that contains sufficient information to uniquely identify a transcript, provided that the tag is obtained from a unique position within each transcript. Then, many transcripts are linked together to form long serial molecules, that can be sequenced, revealing the identity of the multiple tags simultaneously. The expression pattern of any population of transcripts can be quantitatively evaluated by determining the abundance of individual tags, and identifying the gene corresponding to each tag (see, for example, Velculescu et al., Science 270:484-7, 1995; and Velculescu et al., Cell 88:243-51, 1997).

In particular embodiments provided herein, arrays can be used to evaluate miRNA expression, for example to detect a brain hemorrhage, such as SAH or ICH. When describing an array that comprises probes or primers specific for a particular set of miRNA, such an array includes probes or primers specific for the recited miRNAs (such as miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p), and can further include control probes (for example to confirm the incubation conditions are sufficient). In one example, an array is a multi-well plate (e.g., 98 or 364 well plate). In some embodiments, the probe and/or primers are labeled with a detectable label, for example a fluorophore, isotope, enzyme, or any other moiety that is detectable.

Modulating miRNA Expression for Treatment or Prevention of Seizure

It is disclosed herein that many miRNAs are differentially expressed in patients that suffer seizure post brain hemorrhagic, such as ICH. As such, an increase in the level of one or more miRNAs down-regulated in patients with a brain hemorrhage, such as ICH, or a decrease in the level of one or more miRNAs up-regulated in patients with a brain hemorrhage, such as ICH, may be beneficial for inhibiting the development seizure.

Without wishing to be bound by theory, it is believed that alterations in the level of one or more miRNA gene products can result in the deregulation of one or more intended targets for these miRNAs, which can lead to undesirable effects, such as inflammation response. Therefore, altering the level of the miRNA gene product (e.g., by increasing the level of a miRNA that is up-regulated or by decreasing the level of a miRNA that is down-regulated) may successfully treat or ameliorate one or more signs or symptoms of the, such as treat or ameliorate one or more signs or symptoms associated with the brain hemorrhage.

Provided herein is a method of treating a patient with a brain hemorrhage or subject to a seizure by administering to the patient a therapeutically effective amount of an agent that inhibits expression of a miRNA gene product that is up-regulated in patients with predisposition to seizure after a brain hemorrhage, such as SAH or ICH or subject to such a brain hemorrhage compared with a control (such as a healthy control subject). Disclosed is a method of treating and/or preventing a seizure or an associated inflammation response in a subject, including administering to the subject an effective amount of an agent that alters the expression of one or more of miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-31'73-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p.

As used herein, "inhibiting expression of a miRNA gene product" means that the production of the precursor and/or active, mature form of the miRNA gene product after treatment is less than the amount produced prior to treatment. Expression can be altered by decreasing the levels made or degrading the amount present to reduce the level. One skilled in the art can readily determine whether miRNA expression has been inhibited in a subject, using the techniques known in the art and described herein. Inhibition can occur at the level of gene expression (i.e., by inhibiting transcription of a miRNA gene encoding the miRNA gene product) or at the level of processing (e.g., by inhibiting processing of a miRNA precursor into a mature miRNA).

As used herein, a therapeutically effective amount of a compound that inhibits miRNA expression is an amount sufficient to result in a biological effect (such as alleviating one or more signs or symptoms. For example, an agent can decrease or increase the expression level of a target miRNA by a desired amount, for example by at least 2-fold, at least 3-fold, at least 4-fold, at least 5-fold, at least 6-fold, at least 8-fold, at least 10-fold, at least 15-fold, at least 20-fold, at least 30-fold or at least 40-fold relative to a control or reference value.

One skilled in the art can readily determine a therapeutically effective amount of an agent to be administered to a given subject by taking into account several factors, such as the size and weight of the subject; the extent of disease progression; the age, health and sex of the subject; the route of administration; and whether the administration is regional or systemic. One skilled in the art can also readily determine an appropriate dosage regimen for administering to a subject an agent that inhibits expression of miRNA gene product.

In some embodiments, a single agent that inhibits expression of a miRNA gene product is administered to the subject in need of treatment. In other embodiments, two or more agents (such as 2, 3, 4, 5, 6, 7, 8, 9 or 10 or more) that inhibit expression of a miRNA gene product are administered to the subject. When two or more agents are administered to the subject, the agents can be administered simultaneously (or within quick succession, such as within minutes of each other), or they can be administered at different times. For example, two or more agents can be administered one hour, twelve hours, one day, two days, five days, one week, two weeks or one month apart.

An agent that inhibits expression of a miRNA gene product can be any type of compound, such as, but not limited to, a nucleic acid molecule, polypeptide, antibody or small molecule, that is capable of inhibiting expression of one or more miRNA gene products. In some embodiments, the agent is an antisense compound.

Any type of antisense compound that specifically targets a miRNA gene product is contemplated for use to inhibit expression of the target miRNA gene product. In some examples, the agent is an antisense compound selected from an antisense oligonucleotide, a siRNA, or a ribozyme. Methods of designing, preparing and using antisense compounds are within the abilities of one of skill in the art. Furthermore, sequences for the disclosed miRNA gene products are publicly available. Antisense compounds specifically targeting a miRNA that is differentially expressed, (or other target nucleic acid) can be prepared by designing compounds that are complementary to the target nucleotide sequence, such as a pri-miRNA, pre-miRNA or mature miRNA sequence. Antisense compounds need not be 100% complementary to the target nucleic acid molecule to specifically hybridize with the target nucleic acid molecule. For example, the antisense compound, or antisense strand of the compound if a double-stranded compound, can be at least 75%, at least 80%, at least 85%, at least 90%, at least 95%, at least 99% or 100% complementary to the selected target nucleic acid sequence. Methods of screening antisense compounds for specificity are well known in the art (see, for example, U.S. Patent Application Publication No. 2003-0228689).

Generally, the principle behind antisense technology is that an antisense compound hybridizes to a target nucleic acid and effects the modulation of gene expression activity or function. The modulation of gene expression can be achieved by, for example, target RNA degradation or occupancy-based inhibition. An example of modulation of target RNA function by degradation is RNase H-based degradation of the target RNA upon hybridization with a DNA-like antisense compound, such as an antisense oligonucleotide.

Another example of modulation of gene expression by target degradation is RNA interference (RNAi) using small interfering RNAs (siRNAs). RNAi is a form of antisense-mediated gene silencing involving the introduction of double stranded (ds)RNA-like oligonucleotides leading to the sequence-specific reduction of targeted endogenous mRNA levels. Other compounds that are often classified as antisense compounds are ribozymes. Ribozymes are catalytic RNA molecules that can bind to specific sites on other RNA molecules and catalyze the hydrolysis of phosphodiester bonds in the RNA molecules. Ribozymes modulate gene expression by direct cleavage of a target nucleic acid, such as a miRNA gene product.

Each of the above-described antisense compounds provides sequence-specific target gene regulation. This sequence-specificity makes antisense compounds effective tools for the selective modulation of a target nucleic acid of interest, such as a miRNA gene product.

In some embodiments, the antisense compounds are antisense oligonucleotides. The miRNA gene product-specific antisense oligonucleotides can be any suitable length to allow for hybridization and modulation of gene expression. The length of an antisense oligonucleotide can vary, but is typically about 15 to about 40 nucleotides, including 15, 16, 17, 18, 19, 20, 21, 22, 23, 24, 25, 26, 27, 28, 29, 30, 31, 32, 33, 34, 35, 36, 37, 38, 39 or 40 nucleotides. In some embodiments, the antisense oligonucleotides are about 20 to about 35 nucleotides in length. The antisense oligonucleotides can be DNA, RNA or analogs thereof. Furthermore, the oligonucleotides provided herein can be unmodified or can comprise one or more modifications, such as modified internucleoside linkages, modified sugar moieties, modified bases, or a combination thereof. Oligonucleotide modifications are described in detail below.

In other embodiments, the antisense compounds are siRNA molecules. siRNAs useful for the disclosed methods include short double-stranded RNA from about 17 nucleotides to about 29 nucleotides in length, preferably from about 19 to about 25 nucleotides in length, such as about 21 to about 23 nucleotides in length. The siRNAs are made up of a sense RNA strand and a complementary antisense RNA strand annealed together by standard Watson-Crick base-pairing interactions. The sense strand includes a nucleic acid sequence that is substantially identical to a nucleic acid sequence contained within the target miRNA gene product. As used herein, an siRNA nucleic acid sequence that is "substantially identical" to a target sequence is a nucleic acid sequence that is identical to the target sequence, or that differs from the target sequence by one, two or three nucleotides. The sense and antisense strands of the siRNA can either include two complementary, single-stranded RNA molecules, or can be a single molecule having two complementary portions (which are base-paired) separated a single-stranded "hairpin" region.

The siRNA can also be altered RNA that differs from naturally occurring RNA by the addition, deletion, substitution and/or alteration of one or more nucleotides. Such alterations can include addition of non-nucleotide material, such as to one or both of the ends of the siRNA or to one or more internal nucleotides of the siRNA; modifications that make the siRNA resistant to nuclease digestion; or the substitution of one or more nucleotides in the siRNA with deoxyribonucleotides. One or both strands of the siRNA can also include a 3' overhang. As used herein, a "3' overhang" refers to at least one unpaired nucleotide extending from the 3'-end of a duplexed RNA strand. Thus, in certain embodiments, the siRNA includes at least one 3' overhang of from 1 to about 6 nucleotides (which includes ribonucleotides or deoxyribonucleotides) in length, from 1 to about 5 nucleotides in length, from 1 to about 4 nucleotides in length, or from about 2 to about 4 nucleotides in length. In a particular embodiment, the 3' overhang is present on both strands of the siRNA and is 2 nucleotides in length. For example, each strand of the siRNA can comprise 3' overhangs of dithymidylic acid ("TT") or diuridylic acid ("uu").

In other embodiments, the antisense compound is a ribozyme. Ribozymes are nucleic acid molecules having a substrate binding region that is complementary to a contiguous nucleic acid sequence of a miRNA gene product, and which is able to specifically cleave the miRNA gene product. The substrate-binding region need not be 100% complementary to the target miRNA gene product. For example, the substrate-binding region can be, for example, at least about 50%, at least about 75%, at least about 85%, or at least about 95% complementary to a contiguous nucleic acid sequence in a miRNA gene product. The enzymatic nucleic acids can also include modifications at the base, sugar, and/or phosphate groups.

Antisense compounds, such as antisense oligonucleotides, siRNAs and ribozymes, can be produced chemically or biologically, or can be expressed from a recombinant plasmid or viral vector, as described in further detail below in regard to expression of isolated miRNA gene products. Exemplary methods for producing and testing antisense compounds are well known in the art (see, for example, U.S. Pat. Nos. 5,849,902 and 4,987,071; U.S. Patent Application Publication Nos. 2002/0173478 and 2004/0018176; Stein and Cheng, Science 261:1004, 1993; Werner and Uhlenbeck, Nucl. Acids Res. 23:2092-2096, 1995; Hammann et al., Antisense and Nucleic Acid Drug Dev. 9:25-31).

In some examples, the antisense compounds specific for a miRNA gene product contain one or more modifications to enhance nuclease resistance and/or increase activity of the compound. Modified antisense compounds include those comprising modified backbones or non-natural internucleoside linkages. As defined herein, oligonucleotides having modified backbones include those that retain a phosphorus atom in the backbone and those that do not have a phosphorus atom in the backbone.

Examples of modified oligonucleotide backbones include, but are not limited to, phosphorothioates, chiral phosphorothioates, phosphorodithioates, phosphotriesters, aminoalkylphosphotriesters, methyl and other alkyl phosphonates including 3'-alkylene phosphonates and chiral phosphonates, phosphinates, phosphoramidates including 3'-amino phosphoramidate and aminoalkylphosphoramidates, thionophosphoramidates, thionoalkyl-phosphonates, thionoalkylphosphotriesters, and boranophosphates having normal 3'-5' linkages, 2'-5' linked analogs of these, and those having inverted polarity wherein the adjacent pairs of the nucleoside units are linked 3'-5' to 5'-3' or 2'-5' to 5'-2'. Representative U.S. patents that teach the preparation of the above phosphorus-containing linkages include, but are not limited to, U.S. Pat. Nos. 3,687,808; 4,469,863; 4,476,301; 5,023, 243; 5,177,196; 5,188,897; 5,264,423; 5,276,019; 5,278, 302; 5,286,717; 5,321,131; 5,399,676; 5,405,939; 5,453, 496; 5,455,233; 5,466,677; 5,476,925; 5,519,126; 5,536, 821; 5,541,306; 5,550,111; 5,563,253; 5,571,799; 5,587, 361; and 5,625,050.

Examples of modified oligonucleotide backbones that do not include a phosphorus atom therein have backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; alkene containing backbones; sulfamate backbones; methyleneimino and methylenehydrazino backbones; sulfonate and sulfonamide backbones; amide backbones; and others having mixed N, O, S and CH2 component parts. Representative U.S. patents that teach the preparation of the above oligonucleosides include, but are not limited to, U.S. Pat. Nos. 5,034,506; 5,166,315; 5,185, 444; 5,214,134; 5,216,141; 5,235,033; 5,264,562; 5,264, 564; 5,405,938; 5,434,257; 5,466,677; 5,470,967; 5,489, 677; 5,541,307; 5,561,225; 5,596,086; 5,602,240; 5,610, 289; 5,602,240; 5,608,046; 5,610,289; 5,618,704; 5,623, 070; 5,663,312; 5,633,360; 5,677,437; and 5,677,439.

In some embodiments, both the sugar and the internucleoside linkage of the nucleotide units of the oligonucleotide or antisense compound are replaced with novel groups. One such modified compound is an oligonucleotide mimetic referred to as a peptide nucleic acid (PNA). In PNA compounds, the sugar-backbone of an oligonucleotide is replaced with an amide containing backbone, in particular an aminoethylglycine backbone. The bases are retained and are bound directly or indirectly to aza nitrogen atoms of the amide portion of the backbone. Representative U.S. patents that teach the preparation of PNA compounds include, but are not limited to, U.S. Pat. Nos. 5,539,082; 5,714,331; and 5,719,262. Further teaching of PNA compounds can be found in Nielsen et al. (Science 254, 1497-1500, 1991).

Modified oligonucleotides can also contain one or more substituted sugar moieties. In some examples, the oligonucleotides can comprise one of the following at the 2' position: OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted C1 to C10 alkyl or C2 to C10 alkenyl and alkynyl. In other embodiments, the antisense compounds comprise one of the following at the 2' position: C1 to C10 lower alkyl, substituted lower alkyl, alkaryl, aralkyl, O-alkaryl or O-aralkyl, SH, SCH3, OCN, Cl, Br, CN, CF3, OCF3, SOCH3, SO2CH3, ONO2, NO2, N3, NH2, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. In one example, the modification includes 2'-methoxyethoxy (also known as 2'-O-(2-methoxyethyl) or 2'-MOE) (Martin et al., Helv. Chim. Acta., 78, 486-504, 1995). In other examples, the modification includes 2'-dimethylaminooxyethoxy (also known as 2'-DMAOE) or 2'-dimethylaminoethoxyethoxy (also known in the art as 2'-O-dimethylaminoethoxyethyl or 2'-DMAEOE).

Similar modifications can also be made at other positions of the compound. Antisense compounds can also have sugar mimetics such as cyclobutyl moieties in place of the pentofuranosyl sugar. Representative United States patents that teach the preparation of modified sugar structures include, but are not limited to, U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; and 5,700,920.

Oligonucleotides can also include base modifications or substitutions. As used herein, "unmodified" or "natural" bases include the purine bases adenine (A) and guanine (G), and the pyrimidine bases thymine (T), cytosine (C) and uracil (U). Modified bases include other synthetic and natural bases, such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine. Further modified bases have been described (see, for example, U.S. Pat. No. 3,687,808; and Sanghvi, Y. S., Chapter 15, Antisense Research and Applications, pages 289-302, Crooke, S. T. and Lebleu, B., ed., CRC Press, 1993).

Certain of these modified bases are useful for increasing the binding affinity of antisense compounds. These include 5-substituted pyrimidines, 6-azapyrimidines and N-2, N-6 and O-6 substituted purines, including 2-aminopropyladenine, 5-propynyluracil and 5-propynylcytosine. 5-methylcytosine substitutions have been shown to increase nucleic acid duplex stability by 0.6-1.2° C. Representative U.S. patents that teach the preparation of modified bases include, but are not limited to, U.S. Pat. Nos. 4,845,205; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121, 5,596,091; 5,614,617; 5,681,941; and 5,750,692.

Also provided is a method of treating a patient with a brain hemorrhage or subject to a brain hemorrhage by administering to the patient a therapeutically effective amount of an isolated miRNA gene product that is downregulated in a patient with a brain hemorrhage or subject to such a brain hemorrhage, relative to a control (such as a healthy subject). As described herein, the miRNA gene product can be a pri-miRNA, a pre-miRNA or a mature miRNA.

In embodiments, the disclosed methods comprise administering an effective amount of at least one isolated miRNA gene product, or an isolated variant or biologically-active fragment thereof. The isolated miRNA gene product that is administered to the subject can be identical to an endogenous wild-type miRNA gene product (such as a pri-miRNA, pre-miRNA or mature miRNA) that is downregulated, or it can be a variant or biologically-active fragment thereof. As defined herein, a "variant" of a miRNA gene product refers to a miRNA that has less than 100% identity to a corresponding wild-type miRNA gene product and possesses one or more biological activities of the corresponding wild-type miRNA gene product. Examples of such biological activities include, but are not limited to, inhibition of expression of a target RNA molecule (e.g., inhibiting translation of a target RNA molecule, modulating the stability of a target RNA molecule, or inhibiting processing of a target RNA molecule) and inhibition of a cellular process associated with a brain hemorrhage or subject to seizure after a brain hemorrhage. These variants include species variants and variants that are the consequence of one or more mutations (e.g., a substitution, a deletion, an insertion) in a miRNA gene. In certain embodiments, the variant is at least about 70%, at least about 75%, at least about 80%, at least about 85%, at least about 90%, at least about 95%, at least about 98%, or at about 99% identical to a corresponding wild-type miRNA gene product.

As used herein, a "biologically-active fragment" of a miRNA gene product refers to an RNA fragment of a miRNA gene product that possesses one or more biological activities of a corresponding wild-type miRNA gene product. As described above, examples of such biological activities include, but are not limited to, inhibition of expression of a target RNA molecule and inhibition of a cellular process associated with a brain hemorrhage or subject to seizure after a brain hemorrhage. In certain embodiments, the biologically-active fragment is at least about 9, at least about 11, at least about 13, at least about 15, at least about 17 or at least about 19 nucleotides in length.

A therapeutically effective amount of an isolated gene product can be, for example, the amount necessary to alleviate one or more signs or symptoms of seizure after a brain hemorrhage and/or the amount required to delay progression. One of skill in the art can determine the amount of an isolated miRNA gene product required for therapeutic efficacy.

In some embodiments, a single isolated miRNA gene product is administered to the subject in need of treatment. In other embodiments, two or more miRNA gene products (such as 2, 3, 4, 5, 6, 7, 8, 9 or 10 or more) are administered to the subject. When two or more miRNA gene products are administered to the subject, the miRNA gene products can be administered simultaneously (or within quick succession, such as within minutes of each other), or they can be administered at different times. For example, two or more miRNA gene products can be administered one hour, twelve hours, one day, two days, five days, one week, two weeks or one month apart.

In some embodiments, an isolated miRNA gene product can be administered to a subject in combination with one or more additional treatments for seizure after a brain hemorrhage.

As used herein, an "isolated" miRNA gene product is one that is synthesized, or is purified away from other biological components of the cell or tissue in which the miRNA naturally occurs. For example, a synthetic miRNA gene product, or a miRNA gene product partially or completely separated from the other biological components of its natural state is considered to be "isolated." Isolated miRNA gene products can be obtained using a number of standard techniques. For example, the miRNA gene products can be chemically synthesized or recombinantly produced using methods known in the art. In one embodiment, miRNA gene products are chemically synthesized using appropriately protected ribonucleoside phosphoramidites and a conventional DNA/RNA synthesizer. Commercial suppliers of synthetic RNA molecules or synthesis reagents include, for example, Proligo (Hamburg, Germany), Dharmacon Research (Lafayette, CO), Pierce Chemical (Rockford, IL), Glen Research (Sterling, VS), ChemGenes (Ashland, MA) and Cruachem (Glasgow, United Kingdom).

In some embodiments, the method includes administering a vector encoding a miRNA gene product. Vectors can be of non-viral (for example, plasmids) or viral (for example, adenovirus, adeno-associated virus, retrovirus, herpes virus, vaccinia virus) origin. Suitable vectors, such as gene therapy vectors, are well known in the art.

In some examples, the miRNA gene products are expressed from recombinant circular or linear DNA plasmids using any suitable promoter. Suitable promoters for expressing RNA from a plasmid include, for example, the U6 or H1 RNA pol III promoter sequences, or a cytomegalovirus promoter. Selection of other suitable promoters is within the skill in the art. The recombinant plasmids of the invention can also comprise inducible or regulatable promoters for expression of the miRNA gene products.

When two or more miRNA gene products are to be expressed, the miRNA gene products can each be expressed from separate recombinant plasmids, or they can be expressed from the same recombinant plasmid. In one embodiment, the miRNA gene products are expressed as RNA precursor molecules from a single plasmid, and the precursor molecules are processed into the functional miRNA gene product within the target cell. Selection of plasmids suitable for expressing the miRNA gene products, methods for inserting nucleic acid sequences into the plasmid to express the gene products, and methods of delivering the recombinant plasmid to the cells of interest are within the skill in the art (see, for example, Zeng et al., Mol. Cell 9:1327-1333, 2002; Tuschl, Nat. Biotechnol., 20:446-448, 2002; Brummelkarnp et al., Science 296:550-553, 2002; Miyagishi et al., Nat. Biotechnol. 20:497-500, 2002; Paddison et al., Genes Dev. 16:948-958, 2002; Lee et al., Nat. Biotechnol. 20:500-505, 2002; and Paul et al., Nat. Biotechnol. 20:505-508, 2002). In one embodiment, a plasmid expressing the miRNA gene product comprises a sequence encoding a miRNA precursor RNA operably linked to the CMV intermediate-early promoter.

The miRNA gene products can also be expressed from recombinant viral vectors. When administering two or more miRNA gene products, it is contemplated that the miRNA gene products can be expressed from two separate recombinant viral vectors, or from the same viral vector. The RNA expressed from the recombinant viral vectors can either be isolated from cultured cell expression systems by standard techniques, or can be expressed directly in target cells or tissues.

The recombinant viral vectors of use with the disclosed methods include sequences encoding the miRNA gene products and any suitable promoter for expressing the RNA sequences. Suitable promoters include, but are not limited to, the U6 or H1 RNA pol III promoter sequences, or a cytomegalovirus promoter. Selection of other suitable promoters is within the skill in the art. The recombinant viral vectors of the invention can also comprise inducible or regulatable promoters for expression of the miRNA gene products.

Suitable viral vectors include, but are not limited to, adenovirus vectors, adeno-associated virus vectors, retroviral vectors, lentiviral vectors, herpesviral vectors, and the like. For example, adenovirus vectors can be first, second, third and/or fourth generation adenoviral vectors or gutless adenoviral vectors. Adenovirus vectors can be generated to very high titers of infectious particles; infect a great variety of cells; efficiently transfer genes to cells that are not dividing; and are seldom integrated in the host genome, which avoids the risk of cellular transformation by insertional mutagenesis (Zern and Kresinam, Hepatology 25(2), 484-491, 1997). Representative adenoviral vectors which can be used for the methods provided herein are described by Stratford-Perricaudet et al. (J. Clin. Invest. 90: 626-630, 1992); Graham and Prevec (In Methods in Molecular Biology: Gene Transfer and Expression Protocols 7: 109-128, 1991); and Barr et al. (Gene Therapy, 2:151-155, 1995).

Adeno-associated virus (AAV) vectors also are suitable for administration of HCC-associated genes. Methods of generating AAV vectors, administration of AAV vectors and their use are well known in the art (see, for example, U.S. Pat. No. 6,951,753; U.S. Pre-Grant Publication Nos. 2007-036757, 2006-205079, 2005-163756, 2005-002908; and PCT Publication Nos. WO 2005/116224 and WO 2006/119458).

Retrovirus, including lentivirus, vectors can also be used with the methods described herein. Lentiviruses include, but are not limited to, human immunodeficiency virus (such as HIV-1 and HIV-2), feline immunodeficiency virus, equine infectious anemia virus and simian immunodeficiency virus. Other retroviruses include, but are not limited to, human T-lymphotropic virus, simian T-lymphotropic virus, murine leukemia virus, bovine leukemia virus and feline leukemia virus. Methods of generating retrovirus and lentivirus vectors and their uses have been well described in the art (see, for example, U.S. Pat. Nos. 7,211,247; 6,979,568; 7,198,784; 6,783,977; and 4,980,289).

Suitable herpesvirus vectors can be derived from any one of a number of different types of herpesviruses, including, but not limited to, herpes simplex virus-1 (HSV-1), HSV-2 and herpesvirus saimiri. Recombinant herpesvirus vectors, their construction and uses are well described in the art (see, for example, U.S. Pat. Nos. 6,951,753; 6,379,674|6,613,892; 6,692,955; 6,344,445; 6,319,703; and 6,261,552; and U.S. Patent Application Publication No. 2003-0083289).

One skilled in the art can readily determine an effective amount of a miRNA gene product to be administered to a given subject, by taking into account factors, such as the size and weight of the subject; the extent of disease progression; the age, health and sex of the subject; the route of administration; and whether the administration is regional or systemic.

For example, an effective amount of an isolated miRNA gene product can be based on the approximate body weight of a subject to be treated. Such effective amounts can be administered by any suitable route, such as, for example, intravenous or intraarterial. In some examples, an effective amount of the isolated miRNA gene product that is administered to a subject can range from about 5 to about 3000 micrograms/kg of body weight, from about 700 to about 1000 micrograms/kg of body weight, or greater than about 1000 micrograms/kg of body weight.

One skilled in the art can also readily determine an appropriate dosage regimen for the administration of an isolated miRNA gene product to a given subject. For example, a miRNA gene product can be administered to the subject once (e.g., as a single injection or deposition). Alternatively, a miRNA gene product can be administered once or twice daily to a subject for a period of from about three to about twenty-eight days, more particularly from about seven to about ten days. In a particular dosage regimen, a miRNA gene product is administered once a day for seven days. Where a dosage regimen comprises multiple administrations, it is understood that the effective amount of the miRNA gene product administered to the subject can comprise the total amount of gene product administered over the entire dosage regimen.

Agents can be administered to a subject in need of treatment using any suitable means known in the art. Methods of administration include, but are not limited to, intraductal, intradermal, intramuscular, intraperitoneal, parenteral, intravenous, subcutaneous, vaginal, rectal, intranasal, inhalation, oral or by gene gun. Intranasal administration refers to delivery of the compositions into the nose and nasal passages through one or both of the nares and can comprise delivery by a spraying mechanism or droplet mechanism, or through aerosolization of the nucleic acid or virus. Administration of the compositions by inhalant can be through the nose or mouth via delivery by spraying or droplet mechanisms. Delivery can be directly to any area of the respiratory system via intubation. Parenteral administration is generally achieved by injection. Injectables can be prepared in conventional forms, either as liquid solutions or suspensions, solid forms suitable for solution of suspension in liquid prior to injection, or as emulsions. Injection solutions and suspensions can be prepared from sterile powders, granules, and tablets. Administration can be systemic or local.

Agents can be administered in any suitable manner, preferably with pharmaceutically acceptable carriers. Pharmaceutically acceptable carriers are determined in part by the particular composition being administered, as well as by the particular method used to administer the composition. Accordingly, there is a wide variety of suitable formulations of pharmaceutical compositions of the present disclosure.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Formulations for topical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration include powders or granules, suspensions or solutions in water or non-aqueous media, capsules, sachets, or tablets. Thickeners, flavorings, diluents, emulsifiers, dispersing aids or binders may be desirable.

Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

Administration can be accomplished by single or multiple doses. The dose required will vary from subject to subject depending on the species, age, weight and general condition of the subject, the particular therapeutic agent being used and its mode of administration. An appropriate dose can be determined by one of ordinary skill in the art using only routine experimentation.

In some embodiments, the therapeutic agent is a nucleic acid molecule, such as a miRNA gene product, a vector encoding a miRNA gene product, an antisense compound or a vector encoding an antisense compound. A nucleic acid-based therapeutic agent can be administered to a subject by any suitable route. In some examples, the agents are administered using an enteral or parenteral administration route. Suitable enteral administration routes include, for example, oral, rectal, or intranasal delivery. Suitable parenteral administration routes include, for example, intravascular administration (such as intravenous bolus injection, intravenous infusion, intra-arterial bolus injection, intra-arterial infusion and catheter instillation into the vasculature); subcutaneous injection or deposition, including subcutaneous infusion (such as by osmotic pumps); direct application to the tissue of interest, for example by a catheter or other placement device (e.g., a suppository or an implant comprising a porous, non-porous, or gelatinous material); and inhalation. Particularly suitable administration routes are injection, infusion and direct injection into a target tissue.

In the context of the present disclosure, a miRNA gene product or an antisense compound can be administered to the subject either as naked RNA or DNA in combination with a delivery reagent, or can be encoded by a recombinant plasmid or viral vector. Recombinant plasmids and viral vectors including sequences that express the miRNA gene products or antisense compounds, and techniques for delivering such plasmids and vectors to target cells, are well known in the art.

In some embodiments, liposomes are used to deliver a miRNA gene product or antisense compound (or nucleic acids comprising sequences encoding them) to a subject. Liposomes can also increase the blood half-life of the gene products or nucleic acids. Suitable liposomes for use in the invention can be formed from standard vesicle-forming lipids, which generally include neutral or negatively charged phospholipids and a sterol, such as cholesterol. The selection of lipids is generally guided by consideration of several factors, such as the desired liposome size and half-life of the liposomes in the blood stream. A variety of methods are known in the art for preparing liposomes (see, for example, Szoka et al., Ann. Rev. Biophys. Bioeng. 9:467, 1980; and U.S. Pat. Nos. 4,235,871; 4,501,728; 4,837,028; and 5,019,369). In some embodiments, polymers can be used to deliver a miRNA gene product or antisense compound to a subject. Cationic lipids and polymers that can be used to deliver therapeutic RNA molecules have been described (see, for example, Zhang et al., J Control Release. 123(1):1-10, 2007; Vorhies et al., Methods Mol Biol. 480:11-29, 2009; and U.S. Patent Application Publication No. 2009/0306194). Polypeptide carriers can also be used to administer a miRNA gene product to a subject (see, for example, Rahbek et al., J. Gene Med. 10:81-93, 2008).

Appropriate doses of small molecule agents depend upon a number of factors known to those or ordinary skill in the art, e.g., a physician. The dose(s) of the small molecule will vary, for example, depending upon the identity, size, and condition of the subject or sample being treated, further depending upon the route by which the composition is to be administered, if applicable, and the effect which the practitioner desires the small molecule to have upon the nucleic acid or polypeptide of the invention. Exemplary doses include milligram or microgram amounts of the small molecule per kilogram of subject or sample weight (e.g., about 1 microgram per kilogram to about 500 milligrams per kilogram, about 100 micrograms per kilogram to about 5 milligrams per kilogram, or about 1 microgram per kilogram to about 50 micrograms per kilogram).

Also disclosed is a method of determining the effectiveness of an agent for treating and/or preventing a seizure or an associated inflammation response in a subject. The method including detecting expression of at least one of miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR- 363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p in a sample obtained from the subject following treatment with the agent and comparing expression of the at least one of miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p in a sample obtained from the subject following treatment to a reference value, wherein an alteration in the expression of the at least one miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p following treatment indicates that the agent is effective for the agent for treating and/or preventing a seizure or an associated inflammation response in the subject. In some embodiments, the reference value represents an expression value of the at least one of miR-4325, hsa-miR-181a-5p, hsa-miR-1180-3p, and miR-4317, hsa-miR-660-5p, hsa-miR-107, hsa-miR-101-3p, hsa-miR-638, hsa-miR-130a-3p, hsa-miR-103a-3p, hsa-miR-363-3p, hsa-miR-18b-5p, hsa-miR-4301, hsa-miR-106a-5p, hsa-miR-4787-5p, hsa-miR-6893-3p, hsa-miR-346, hsa-miR-200b-5p, hsa-miR-335-3p, hsa-miR-206 or hsa-miR-3126-3p, hsa-let-7d-5p, hsa-let-7a-5p, hsa-let-7f-5p, hsa-miR-98-5p, hsa-miR-4492, hsa-miR-4508, hsa-miR-4707-5p, hsa-miR-144-5p, hsa-miR-4488, hsa-miR-576-5p, hsa-miR-1273g-3p, hsa-miR-374c-5p, hsa-miR-6794-3p, hsa-miR-663a, hsa-miR-4718, hsa-miR-3613-5p, hsa-miR-6809-5p, hsa-miR-629-5p, hsa-miR-1258, hsa-miR-1468-5p, hsa-miR-6867-5p, hsa-miR-3194-3p, hsa-miR-4778-5p, hsa-miR-130b-5p, hsa-miR-548au-5p, hsa-miR-6894-3p, hsa-miR-98-3p, hsa-miR-3173-5p, hsa-miR-138-1-3p, hsa-miR-4298, hsa-miR-1231, hsa-miR-3917, hsa-miR-3180, hsa-miR-99b-3p, hsa-miR-1285-5p, hsa-miR-20b-3p, hsa-miR-6847-5p, hsa-miR-154-5p, hsa-miR-1273e, or hsa-miR-6506-3p in a sample from the subject prior to treatment with the agent.

EXAMPLE

Methods

Patient Selection and Sample Collections

Patients who were admitted to the Neurointensive Care Unit for management of acute spontaneous ICH confirmed on computed tomography (CT) scan were screened and consented. Venous blood samples (5 ml) were collected in Paxgene Blood RNA Tubes within 48 hours of presentation. Samples were incubated at room temperature overnight, transferred to −20° C. for 48 hrs and stored at −80° C. until processed for total RNA extraction.

In addition, the following demographic and clinical information were collected: gender, age, hypertension, smoking, and ICH volume (Table 4). Follow up interviews were performed and review of electronic medical records to capture new onset seizures within the time frame 14 days to 1 year from ICH onset.

TABLE 4

Patient Profile and PaxGene Sample Collection

| Subject | Age/Sex | ICH Vol (mL) | Hypertension | Smoking | Post-ICH Seizure (Y or N) |
|---|---|---|---|---|---|
| 1 | 42F | 9.2 | Y | N | N |
| 2 | 61M | 71.9 | Y | N | N |
| 3 | 64M | 7 | Y | Y | N |
| 4 | 83F | 8.6 | Y | N | N |
| 5 | 83F | 40.3 | Y | N | N |
| 6 | 58M | 90.1 | Y | N | Y |
| 7 | 56F | 2.3 | Y | N | N |
| 8 | 54M | 14.5 | Y | N | Y |
| 9 | 69F | 40.4 | Y | N | Y |
| 10 | 49M | 35.5 | Y | N | N |
| 11 | 42M | 48.4 | Y | N | N |
| 12 | 52M | 3.6 | Y | N | Y |
| 13 | 54M | 8.6 | Y | N | Y |
| 14 | 59F | 40 | Y | N | N |
| 15 | 65F | 0 | N | N | N |
| 16 | 59F | 0 | Y | N | N |
| 17 | 71F | 0 | Y | N | N |
| 18 | 65M | 91.8 | Y | Y | Y | miRNA Microarray and Gene Expression Profiling

Total whole blood RNA (seizure ICH, n=3; non-seizure ICH, n=9; Normal non-ICH, n=3) was prepared from Paxgene whole blood RNA tube using the Paxgene RNA Extraction Kit (Qiagen). Sample quality and quantity were analyzed using Nanodrop spectrophotometer and Bioanalyzer (Agilent). Total RNA containing miRNA were used to profile 2,515 known miRNA using uParaflo Microfluidic Biochip and digital gene expression was carried out using RNAseq (Illumina). Expressions of miRNA were filtered into two groups based on relative abundance or signal intensity greater or less than 500 prior to statistical analysis. Differential gene expression, Gene Ontology and KEGG pathway analysis were carried out using Limma Bioconductor packages and miRWalk 2.0 (Ritchie et al., Nucleic Acids Res. 2015 Apr. 20; 43(7):e47; Dweep et al., J Biomed Inform. 2011 October; 44(5):839-47; Dweep et al., Nat Methods. 2015 August; 12(8):697) Gene targets of significant miRNAs and gene set enrichment analysis (GSEA) were identified using miRTarBase and miRWalk 2.0.

Total RNA was used for library preparation and mRNA sequencing according to the Directional mRNASeq SamplePrep (Illumina) and Hi-Seq sequencing (Illumina). Paired-end reads were mapped to the human genome (Ensembl GRCH37) using Bowtie2, v 2.2.9. mRNA abundance was estimated using RSEM v 1.2.0. Differential gene expression was analyzed using EgdeR (v 3.12.1 Bioconductor package and genes with log 2(Fold Change)>1 or genes showing significant differences (p<0.05) were selected for enrichment analysis for Gene Ontology (GO) and KEGG pathway using GAGE (v 2.20.1).

Mirna-mRNA Integration.

The identified differentially expressed genes (p<0.05) and miRNA (p<0.05) were used for regulatory network analysis using Magia² (Bisognin et al., Nucleic Acids Res. 2012 July; 40(Web Server issue):W13-21) and enrichment analysis using the DAVID platform (Huang et al., Nat Protoc. 2009; 4(1):44-57; Huang et al., Nucleic Acids Res. 2009 January; 37(1):1-13). Matched gene expression using Ensembl ID and miRNA data were used for Pearson correlation analysis using DIANA-MicroT algorithm for target prediction (Maragkakis et al., Nucleic Acids Res. 2009 July; 37(Web Server issue):W273-276) for the top 75% targets.

Real-Time RT-PCR Analysis.

Total RNA containing small RNAs were prepared from whole blood of seizure ICH (n=6), non-seizure ICH (n=9), and healthy, normal control (n=3) collected in PaxGene tubes as previously described. For real-time PCR, total blood RNA (5 ng) was used to prepare cDNA using the Universal RT microRNA kit (Exiqon). The cDNA was diluted 1:80 and 5 ul was used for PCR amplification using 2×iTaq SYBR Green master mix and miRCURY LNA microRNA primer (Exiqon). PCR amplification was carried out in a 7500 Fast Thermal Cycler (ABI) using recommended parameters for LNA microRNA primer for 40 cycles. Cycle threshold (Ct) data were manually adjusted and normalized to the U6 miRNA and differential expression was determined using the $2^{-\Delta\Delta Ct}$ method (Livak and Schmittgen, Methods. 2001 December; 25(4):402-8). Differential miRNA expression was determined between seizures vs non-seizures and healthy individuals using the t-test (p<0.05).

Results

Differential Expression of miRNA in Whole Blood of Seizure ICH Vs Non-Seizure

After statistical data processing to remove miRNA that were not reliably expressed in seizures vs non-seizures including the normal samples, a total of 15 miRNA were identified (Table 1A, p<0.05). Of these, only two miRNA (miR-4325 and miR-4317) were downregulated in seizure ICH vs non-seizure ICH plus normal sample. Of these, only 5 miRNA were expressed at greater or less than 2-fold change in seizures vs non-seizures (Table 5). The heatmap of significantly expressed miRNA is shown (FIG. 1). Of the 15 significantly expressed miRNA, only two miRNA (miR-4317 and miR-18b-5p) were found expressed at low abundance or with signal intensity less than 500.

Table 1A: The top significantly expressed miRNA in Seizure vs nonSeizure plus Normal: 2 down-regulated in seizure and 13 up-regulated in seizure. Data are arranged according to statistical significance, using the Benjamin-Hochberg method of multiple testing corrections.

TABLE 1A

Top significantly expressed miRNA in Seizure vs. NonSeizure in sICH

| miRNA ID | Seizure (Mean) | NonSeizure (Mean) | Log2 (non-Seizure/Seizure) | P-value |
|---|---|---|---|---|
| hsa-miR-4325 | 129 | 921 | 2.84 | 5.57E−03 |
| hsa-miR-181a-5p | 1,540 | 760 | −1.02 | 7.27E−03 |
| hsa-miR-660-5p | 606 | 316 | −0.94 | 1.30E−02 |
| hsa-miR-107 | 8,595 | 4,440 | −0.95 | 1.33E−02 |
| hsa-miR-1180-3p | 529 | 362 | −0.55 | 1.37E−02 |
| hsa-miR-101-3p | 987 | 201 | −2.30 | 1.57E−02 |
| hsa-miR-638 | 3,909 | 3,216 | −0.28 | 2.08E−02 |
| hsa-miR-130a-3p | 1,803 | 1,060 | −0.77 | 2.51E−02 |
| hsa-miR-103a-3p | 8,838 | 4,673 | −0.92 | 2.52E−02 |
| hsa-miR-363-3p | 9,254 | 6,494 | −0.51 | 2.58E−02 |
| hsa-miR-18b-5p | 295 | 91 | −1.70 | 2.79E−02 |
| hsa-miR-4301 | 3,156 | 2,141 | −0.56 | 3.74E−02 |
| hsa-miR-106a-5p | 6,517 | 3,337 | −0.97 | 4.23E−02 |
| hsa-miR-4787-5p | 3,828 | 3,129 | −0.29 | 4.58E−02 |
| hsa-miR-4317 | 88 | 285 | 1.69 | 4.58E−02 |

TABLE 5 miRNAs and validated targets

| miRNA | Targets |
|---|---|
| miR-101-3p | FRS2, GMEB2, PSPC1, SLC7A2, GPAM, PLEKHA1, 10ORF88, TOR1AIP1, UBE2B, UBE2D3, STYX, LIFR |
| miR-103a-3p | MPDU1, SYS1, ATG9A, SON, LUC7L, ZNF585B, CDC25A, GNAT1, ZNF680, SMARCA5, EL, C2ORF42, GPR180, ARGLU1, CDK17, CAMKK2, CDC83, GLP2R, IPPK, GABARAPL1, GPRC5A, UBFD1, SHOC2, ZRANB1, C1ORF21, IVNS1ABP, GPD1, EPC1, WEE1, TMEM43, NUFIP2, HIST2H2BE, YRDC, SLC6A9, FAM9C, RSI, MYO5B, MEX3C, BCL2, CRKL, CRKL, PHC3, MED13, CDC42SE2, SVIP, DNAJC10, SLC39A10, FKBP1A, SLC35B2, RPS24, TBC1D12, RPRD1B, DIEXF, AM122B, CD274, TMCC1, PNPLA6, PAQR3, ORC4, ZYX, SAV1, ATG14 |
| miR-106a-5p | SOD2, ZNF665, FGFR1OP, TMEM196, FKBP14, FAHD1, PDPK1, ZNF780A, QRFPR, HSPA4L, ABHD18, C7A11, FHDC1, SLC35F5, ABCG8, SOCS5, C14orf119, RAN, ZDHHC20, SLC2A3, SMG1, DCTN5, HEATR1, LEPROT, PIWIL2, C15orf41, PAK6, CYP19A1, CBX5, A1CF, CCDC6, NEK8, CHTF8, VPS53, THEM4, DIS3L, ZNF785, MYLK3, PAPD5, PTRF, CXorf38, KLF6, SMAD4, TBL1XR1, ZMAT3, CCDC47, PRKAR1A, ABI2, ZNF264, MAVS, PRNP, F2RL1, BHMT2, RAB42, MYH9, ZBED1, SGPL1, FAS, ZNF665, PTGIS, SNAP47, EFCAB11, ZFYVE21, ZNF7, FMNL2, METTL8, YWHAZ, LRPAP1, OCIAD1, MDM2, ITGA2, SREK1IP1 |

TABLE 5-continued miRNAs and validated targets

| miRNA | Targets |
|---|---|
| miR-107 | EML4, TBRG1, ZNF585B, GNAT1, ZNF680, METRNL, EML4, CCDC83, CYSLTR2, COPS7A, GPRC5A, GNG12, SLC30A7, CCNT1, FAM9C, RS1, ZADH2, RNF168, ERN1, CDC42SE2, DNAJC10, CYP2C8, ORC4 |
| miR-130a-3p | TMEM2, IGF2R, SLC35E2B, IL23R, STK38L, SLC38A2, SLC38A2, TPP1, SLC46A1, KLHL36, TXNIP, DTX4, MAVS, CTSA, ZNF317, THAP6, UQCRB, FAM114A1 |
| miR-181a-5p | PEBP1, HSPA13, COL27A1, CDKN1B, SORT1, ZNF445, SCAMP2, SLCO2A1, HOOK3, GPR78, SLC35B4 |
| miR-18b-5p | TXNIP, C15orf8, AP3S2, AP3S2, ZNF585B, TSC22D3, PSAT1, CDCA5, MAPK13, PITPNA, DCTN5, AHI1, PTCHD1, RNF4 |
| miR-660-5p | STARD7, DYNLL2 |
| miR-4317 | SLC38A1, SLC3A1 |
| miR-96-5p | USP5, UBE2D4, SOX5, FOXO3, TP53INP1, EFNb2, BRWD1, CGGBP1, PITPNM3, TUBD1, YWHAG, ATXN1L, NPTX1 |
| miR-206 | TM4SF1, TWIST1, TRIM56, DLK1, ESR1, SERP1, NOTCH3, SPTLC3, NUDT21, RGP1 |
| miR-4325 | PGPEP1, PTAR1, ZNF394, ARNTL2, SHE, NCAPG2, ZNF84, RBMS2, GOLGA8H, GOLGA8H, GOLGA8H, CLOCK, CNNM3, LRPAP1, ALDH9A1, ZNF264, IRGQ, TNIP3, FNBP1L, MAPK8, |
| miR-34b-3p | ULK2, ZNF619, GMPPB, GUF1, ZNF426, PTK6, GJD3, JAG1, CCND1, TRPM7, NUS1, SH3RF2, PRPS1, PUS7, SASH1, ASAP2, FMNL2, C9orf91 |

Comparison of post-ICH seizures vs healthy-normal control group (Table 1B) found 11 statistically significant miRNA, of which 4 were found in high abundance with signal intensity >500, including miR-181a-5p, miR-4325, miR-1180-3p, and miR-625-5p. Similarly, comparison of non-seizure ICH vs normal (Table 1C) identified 41 statistically significant miRNA, of these only miR-625-5p was previously identified in seizure ICH vs normal (Table 2B-top 15, Table 5). This suggests that miR-625-5p are downregulated in acute ICH compared to normal, but not distinguishable between post-ICH seizure vs non-seizure ICH. Furthermore, let-7d-5p, let-7a-5p, and let-7f-5p are found at high abundance in normal but significantly decreased in non-seizure ICH.

Table 1B: The top significantly expressed miRNA in Seizure ICH vs Normal. Data are arranged according to statistical significance, using the Benjamin-Hochberg method of multiple testing corrections.

TABLE IB

Significantly expressed miRNA in aICH Seizure vs. Normal

| miRNA ID | Seizure (Mean) | Normal (Mean) | Log2 (Normal/ Seizure) | P-value |
|---|---|---|---|---|
| hsa-miR-4325 | 129 | 877 | 2.77 | 8.93E−03 |
| hsa-miR-181a-5p | 1,540 | 668 | −1.20 | 4.07E−02 |
| hsa-miR-1180-3p | 529 | 254 | −1.06 | 7.03E−03 |
| hsa-miR-625-5p | 254 | 715 | 1.50 | 2.11E−02 |
| hsa-miR-6893-3p | 40 | 13 | −1.64 | 3.43E−03 |
| hsa-miR-346 | 30 | 6 | −2.29 | 1.41E−02 |
| hsa-miR-200b-5p | 34 | 1,060 | −2.14 | 2.84E−02 |
| hsa-miR-335-3p | 4 | 39 | 3.27 | 3.62E−02 |
| hsa-miR-206 | 23 | 44 | 0.92 | 4.34E−02 |
| hsa-miR-4317 | 88 | 317 | 1.85 | 4.38E−02 |
| hsa-miR-3126-3p | 30 | 8 | −1.94 | 4.91E−02 |

Table 1C The top significantly expressed miRNA in Nonseizure ICH vs Normal. Data are arranged according to statistical significance, using the Benjamin-Hochberg method of multiple testing corrections.

TABLE 1C

Significantly expressed miRNA in nonSeizure aICH vs. Normal

| miRNA ID | N-Seizure (Mean) | Normal (Mean) | Log2 (Normal/ N-Seizure) | P-value |
|---|---|---|---|---|
| hsa-miR-625-5p | 276 | 715 | 1.38 | 5.75E−03 |
| hsa-let-7d-5p | 2,637 | 7,434 | 1.50 | 6.14E−03 |
| hsa-let-7a-5p | 3,088 | 7,709 | 1.32 | 7.56E−03 |
| hsa-let-7f-5p | 2,218 | 7,217 | 1.70 | 1.22E−02 |
| hsa-miR-98-5p | 146 | 402 | 1.46 | 3.43E−02 |
| hsa-miR-4492 | 4,481 | 3,028 | −0.57 | 3.62E−02 |
| hsa-miR-4508 | 7,605 | 5,660 | −0.43 | 3.83E−02 |
| hsa-miR-4707-5p | 838 | 422 | −0.99 | 4.10E−02 |
| hsa-miR-144-5p | 705 | 1,292 | 0.87 | 4.31E−02 |
| hsa-miR-4488 | 2,449 | 1,749 | −0.49 | 4.33E−02 |
| hsa-miR-576-5p | 280 | 526 | 0.91 | 4.37E−02 |
| hsa-miR-1273g-3p | 10,044 | 5,178 | −0.96 | 4.58E−02 |
| hsa-miR-374c-5p | 534 | 1,271 | 1.25 | 4.97E−02 |
| hsa-miR-6794-3p | 23 | 7 | −1.81 | 2.84E−03 |
| hsa-miR-663a | 188 | 88 | −1.10 | 3.38E−03 |
| hsa-miR-4718 | 14 | 0 | −10.28 | 3.94E−03 |
| hsa-miR-3613-5p | 7 | 47 | 2.74 | 5.37E−03 |
| hsa-miR-6809-5p | 28 | 42 | 0.57 | 5.96E−03 |
| hsa-miR-629-5p | 153 | 286 | 0.90 | 6.68E−03 |
| hsa-miR-1258 | 6 | 4 | −0.46 | 7.28E−03 |
| hsa-miR-1468-5p | 5 | 24 | 2.21 | 1.12E−02 |
| hsa-miR-6867-5p | 105 | 145 | 0.46 | 1.32E−02 |
| hsa-miR-3194-3p | 12 | 3 | −2.18 | 1.46E−02 |
| hsa-miR-4778-5p | 140 | 213 | 0.60 | 1.87E−02 |
| hsa-miR-130b-5p | 42 | 179 | 2.10 | 2.05E−02 |
| hsa-miR-548au-5p | 6 | 9 | 0.62 | 2.37E−02 |
| hsa-miR-6894-3p | 15 | 24 | 0.65 | 2.40E−02 |
| hsa-miR-98-3p | 4 | 21 | 2.31 | 2.41E−02 |
| hsa-miR-3173-5p | 105 | 174 | 0.74 | 2.50E−02 |
| hsa-miR-138-1-3p | 30 | 46 | 0.64 | 2.65E−02 |
| hsa-miR-4298 | 315 | 394 | 0.33 | 2.84E−02 |
| hsa-miR-1231 | 35 | 14 | −1.28 | 2.92E−02 |
| hsa-miR-3917 | 19 | 8 | −1.23 | 3.40E−02 |
| hsa-miR-3180 | 17 | 6 | −1.61 | 3.44E−02 |
| hsa-miR-99b-3p | 9 | 11 | 0.40 | 3.87E−02 |
| hsa-miR-1285-5p | 49 | 97 | 1.00 | 3.95E−02 |

TABLE 1C-continued

Significantly expressed miRNA in nonSeizure aICH vs. Normal

| miRNA ID | N-Seizure (Mean) | Normal (Mean) | Log2 (Normal/ N-Seizure) | P-value |
|---|---|---|---|---|
| hsa-miR-20b-3p | 7 | 14 | 0.96 | 4.12E−02 |
| hsa-miR-6847-5p | 14 | 20 | 0.48 | 4.51E−02 |
| hsa-miR-154-5p | 13 | 11 | −0.29 | 4.51E−02 |
| hsa-miR-1273e | 8 | 6 | −0.52 | 4.69E−02 |
| hsa-miR-6506-3p | 27 | 41 | 0.63 | 4.71E−02 |

Figure 4:
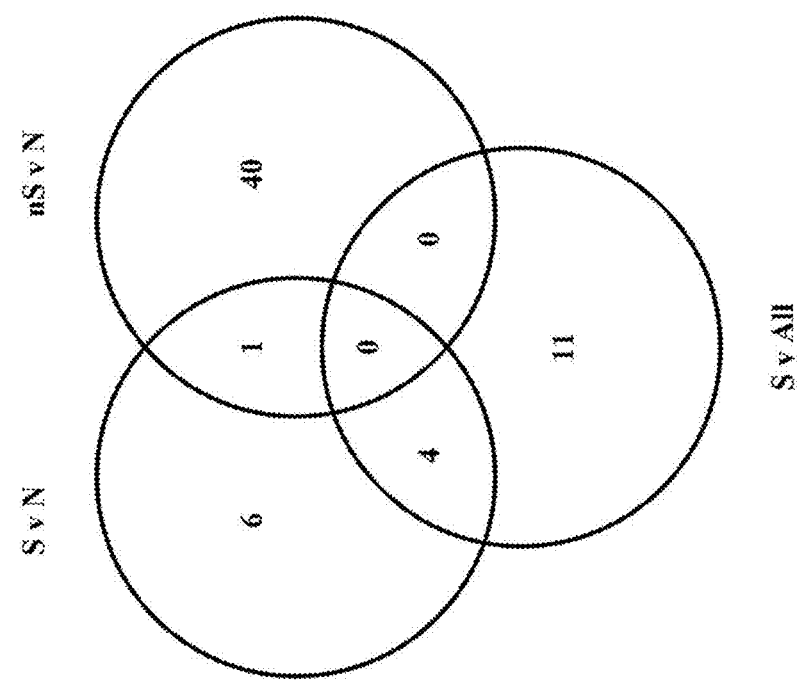
FIG. 4 is a Venn Diagram of significantly expressed miRNA in Seizures ICH, non-seizures ICH, and normal.

As shown in the Venn diagram (FIG. 4) (Oliveros J C. Venny 2.1 [Internet]. Venny. 2007. Available from: http://bioinfogp.cnb.csic.es/tools/venny/index.html), comparison among the three groups identified 21 miRNA that discern post-ICH seizure from non-seizure ICH: 6 miRNA that distinguish post-ICH seizures from normal, and 4 miRNA were unique to seizure and 11 miRNA in post-ICH Seizure vs. NonSeizure and Normal. (See Tables 6-8).

TABLE 6

6 miRNA that distinguish post-ICH seizures from Normal

| hsa-miR-6893-3p | hsa-miR-346 | hsa-miR-200b-5p | hsa-miR-335-3p | hsa-miR-206 |
|---|---|---|---|---|
| hsa-miR-3126-3p | | | | |

TABLE 7

4 miRNA that are unique to Seizure

| hsa-miR-4325 | hsa-miR-181a-5p | hsa-miR-1180-3p | hsa-miR-4317 |
|---|---|---|---|

TABLE 8

11 miRNA in post-ICH Seizure vs. NonSeizure and Normal

| hsa-miR-660-5p | hsa-miR-107 | hsa-miR-101-3p | hsa-miR-638 | hsa-miR-130a-3p |
|---|---|---|---|---|
| hsa-miR-103a-3p | hsa-miR-363-3p | hsa-miR-18b-5p | hsa-miR-4301 | hsa-miR-106a-5p |
| hsa-miR-4787-5p | | | | |

Hence, the 4 miRNA that were identified uniquely in seizure may serve as putative biomarker of post-ICH seizure included miR-4325, miR-181a-5p, miR-1180-3p, and miR-4317. The validated target mRNA for the selected miRNA based on the miRTar database are shown (Table 5). The two downregulated miR-4325 and miR-4317 target genes are associated with transporters (amino acid, magnesium), zinc finger proteins, and genes coding for cytokines and receptors associated with NF-kB activation.

Table 2A GSEA of miRNA that are expressed at high levels in nonSeizure compared Seizure sICH using miRWalk 2.0. No significant enrichment for KEGG pathways and GO biological processes were found for down-regulated miRNA. GO molecular function for down-regulated miRNA are mainly associated with kinase and ion channel activity

TABLE 2A

GSEA analysis of miRNA in seizure vs non-seizure ICH

| | p-value |
|---|---|
| Seizure- miRNA upregulated KEGG | |
| Hsa04110 Cell cycle | 0.0003 |
| Hsa04068 FoxO signaling pathway | 0.0005 |
| Hsa04722 Neurotrophin signaling pathway | 0.0053 |
| Seizure-miRNA upregulated BioProcesses | |
| GO:0006974 cellular response to DNA damage stimulus | 0.0001 |
| GO:0006977 DNA damage response, signaling transduction by p53 class mediator resulting in cell cycle arrest | 0.0012 |
| GO:0051865 Protein autoubiquitination | 0.0009 |
| GO:0001933 Negative regulation of protein phosphorylation | 0.001 |
| Go:0046777 Protein autophosphorylation | 0.0011 |
| Seizure- miRNA upregulated Molecular Functions | |
| GO:0008517 Folic acid transporter activity | 0 |
| GO:0070412 R-Smad binding | 0 |
| GO:0061631 Ubiquitin conjugating enzyme activity | 0 |
| GO:0004871 Signal transducer activity | 0.0001 |
| GO:0003755 Peptidyl prolyl cis-trans isomerase activity | 0.0003 |

TABLE 2A-continued

GSEA analysis of miRNA in seizure vs non-seizure ICH

| | p-value |
|---|---|
| Seizure-miRNA downregulated Molecular Functions | |
| GO:0004143 Diacylglycerol kinase activity | 0 |
| GO:0005251 Delayed rectifier potassium channel activity | 0 |
| GO:0051219 Phosphoprotein binding | 0.0001 |
| GO:0005248 Voltage-gated sodium channel activity | 0.0001 |
| GO:0004713 Protein tyrosine kinase activity | 0.0002 |

Gene Set Enrichment Analysis of miRNA in Seizures Vs Non-Seizures

The 15 miRNA (13 upregulated and 2 downregulated) that were found in post-ICH seizures when compared to non-seizures plus normal were analyzed for GO and KEGG pathway enrichment based on the validated mirTarbase target mining available in miRWalk 2.0 (Dweep et al., J Biomed Inform. 2011 October; 44(5):839-47; Dweep and Gretz, Nat Methods. 2015 August; 12(8):697). The KEGG pathways that were found significantly enriched (adjusted P-value<0.05) are shown (Table 3A and 3B). These include cell cycle, FoxO signaling, neurotrophin signaling and focal adhesion for upregulated miRNA. Conversely for downregulated miRNA, no significant KEGG pathways were found (adjust P-value<0.05). However, a greater number of KEGG pathways were found for downregulated miRNA (adjusted P-value<0.05, among them are phosphatidylinositol, prolactin, phospholipase D, and FoxO signaling.

Table 3A, The top significantly expressed mRNA for seizure ICH vs non-seizure ICH,

TABLE 3 A

Significantly expressed mRNA in Seizure ICH vs. nonSeizure ICH

| Gene Symbol | Log2 | P-value | Gene Symbol | Log2 | P-value |
|---|---|---|---|---|---|
| PLSCR4 | -3.93 | 7.01E-005 | POC1B-GALNT4 | 8.83 | 5.90E-007 |
| RSAD2 | -3.62 | 9.45E-006 | PAGE2B | 5.57 | 1.08E-002 |
| HERC5 | -3.54 | 2.23E-008 | C19orf33 | 5.17 | 6.91E-003 |
| AC016722.2 | -3.46 | 1.57E-003 | CLEC18B | 5.00 | 4.95E-002 |
| ABRA | -3.39 | 2.84E-002 | APOBEC2 | 4.99 | 8.29E-003 |
| IFIT1 | -3.31 | 8.78E-006 | NEBL | 4.91 | 1.32E-002 |
| OAS3 | -3.29 | 1.85E-007 | CTD-2054N24.2 | 4.80 | 3.10E-003 |
| WEE2 | -3.26 | 2.42E-002 | STEAP2 | 4.70 | 1.09E-002 |
| MX1 | -3.18 | 3.40E-007 | GREM2 | 4.58 | 1.18E-002 |
| OTOF | -3.17 | 3.80E-004 | ISPD | 4.55 | 4.12E-002 |
| CMPK2 | -3.01 | 2.42E-006 | SEMG1 | 4.48 | 1.64E-002 |
| CCL8 | -2.98 | 1.90E-003 | AL136531.1 | 4.47 | 9.45E-003 |
| C1orf146 | -2.96 | 3.06E-002 | C2CD4A | 4.36 | 2.64E-002 |
| MYLPF | -2.92 | 1.98E-003 | FLJ27352 | 4.27 | 2.40E-002 |
| OAS2 | -2.88 | 1.51E-007 | FGF22 | 4.17 | 4.35E-002 |
| USP18 | -2.88 | 2.69E-005 | ZNF709 | 3.98 | 9.49E-003 |
| FAM107A | -2.87 | 9.37E-004 | FGF13 | 3.29 | 8.65E-003 |
| PCDH11Y | -2.78 | 2.89E-002 | AP3B2 | 3.28 | 3.14E-002 |
| NR2E1 | -2.76 | 2.10E-002 | COL4A3 | 3.22 | 5.77E-004 |
| SLC1A3 | -2.72 | 1.90E-004 | NBEA | 3.21 | 3.50E-003 |
| IFIT2 | -2.72 | 8.97E-009 | RPP14 | 3.16 | 3.84E-002 |
| ISG15 | -2.72 | 4.62E-004 | ABI3BP | 2.90 | 9.26E-003 |
| IFIT3 | -2.70 | 1.62E-005 | PBOV1 | 2.85 | 2.69E-002 |
| IFI44 | -2.70 | 5.41E-005 | PCSK4 | 2.79 | 3.67E-002 |

TABLE 3B

GSEA of significantly expressed mRNA (p < 0.05).
Table 3B. Top expressed mRNA and GSEA of KEGG pathway

| KEGG pathway | Upregulated mRNA in Seizure |
|---|---|
| NOD-like receptor signaling | IRF9, RBCK1, TXNIP, NLRP3, GBP1, IFI16, IRF7, OAS1, OAS2, OAS3, RNF31, STAT1, STAT2, TLR4 |
| RIG-I-like receptor signaling | DDX58, CXCL10, IRF7, IFIH1, DHX58, ISG15 |
| Cytosolic DNA-sensing | ADAR, TREX1, DDX58, CSCL10, IRF7, ZBP1 |

For GSEA-GO Biological Processes of upregulated miRNA identified protein destabilization, DNA damage response, and protein ubiquitination, to name a few (adjusted P-value<0.05). For downregulated miRNA, no significant biological processes were found based on adjusted P-value cutoff; however, sodium ion and water transport, and focal adhesion were identified (P-value<0.05). GSEA-GO Molecular Function of upregulated miRNA identified R-Smad binding, ubiquitin conjugating enzyme, endoribonuclease activity, and cadherin binding (adjusted P-value<0.05). For downregulated miRNA, diacylglycerol kinase and ion channel activities were found enriched (adjusted P-value<0.05).

RT-PCR Confirmation of Differentially Expressed miRNA

Figure 2A:
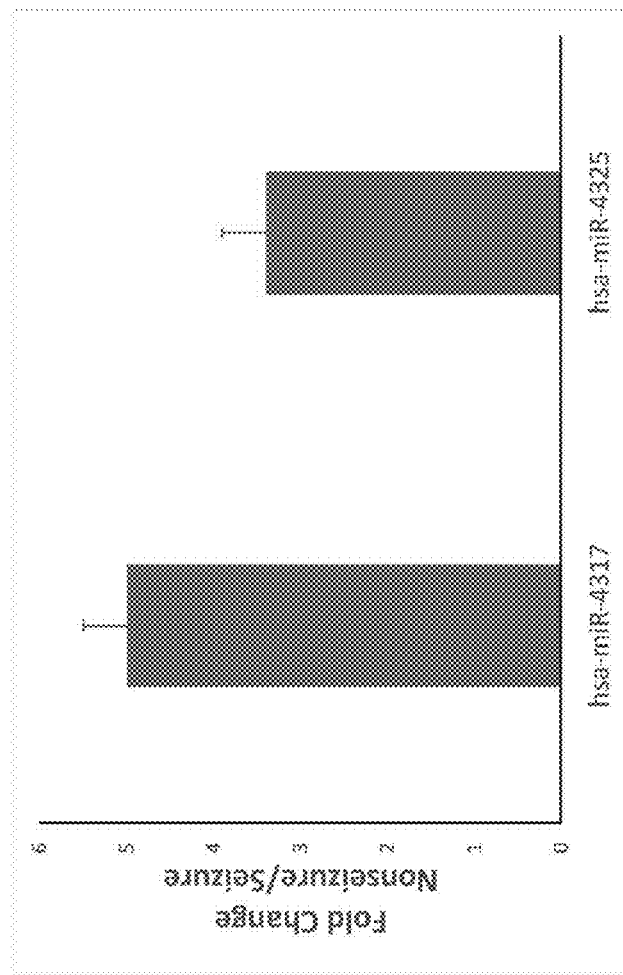
FIG. 2A shows RT-PCR analysis and validation of miR-4317 and miR-4325 in Seizures (n=6) vs nonSeizures (n=9). Results represent mean fold change difference between nonSeizure vs Seizure. Expression of these miRNA are downregulated in seizure ICH.
Figure 2B:
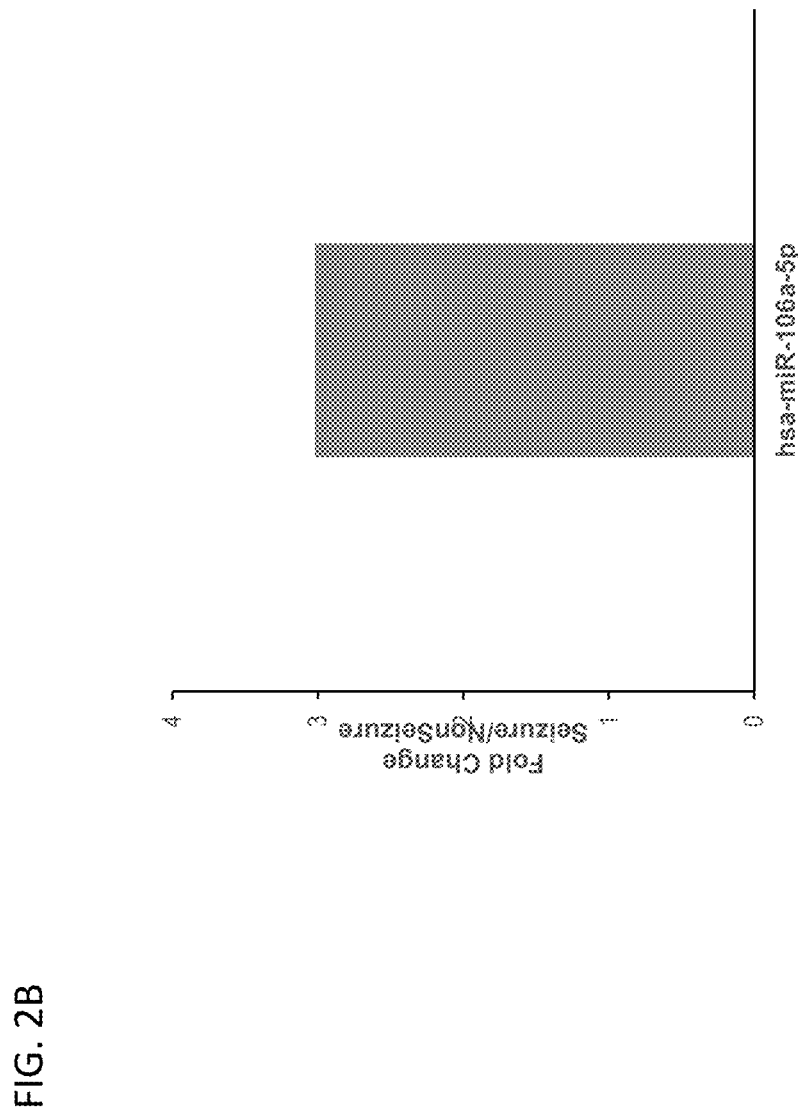
FIG. 2B shows expression of hsa-miR-106a-5p (MI0000113) increased 3-fold in seizure compared to non-seizure and normal.

A number of miRNAs that were found statistically significant by microarray were selected for real-time PCR validation on 6 post-ICH seizure samples, including the 3 samples used for microarray analysis. As shown, hsa-miR-4317 and hsa-miR-4325 were found at 5-fold and 3-fold lower in post-ICH seizure, respectively (FIG. 2A). The decreased expressions of these two miRNA in post-ICH seizures to the combined normal and non-seizure ICH confirmed the microarray results. When the expressions of hsa-miR-4317 in post-ICH seizures and non-seizure ICH were compared separately to healthy-normal control group, hsa-mir-4317 decreased 2-fold in post-ICH seizures and 4-fold in non-seizure ICH. Conversely, hsa-miR-4325 decreased 4-fold in post-ICH seizures and 2-fold in non-seizure ICH. Also tested were hsa-miR-101-3p and hsa-miR-106a-5p, two miRNA that increased in post-ICH seizure. The expression of hsa-miR-101-3p increased 2-fold and hsa-miR-106a-5p increased 3-fold in post-ICH seizures compared to non-seizure ICH and normal (see FIG. 2B), confirming the microarray results. When compared separately to healthy-normal control group, both miRNA exhibited large fold decrease of 36-fold and 53-fold for hsa-miR-101-3p, and for hsa-miR-106a-5p, 36-fold and 19-fold for non-seizure sICH and post-ICH seizures, respectively.

Differential Gene Expression and GSEA in Post-ICH Seizures Vs Non-Seizure ICH

Gene expression analysis identified 331 upregulated and 136 downregulated genes in post-ICH seizures compared to non-seizure ICH and healthy, normal control. These genes only included protein coding, small RNAs, anti-sense RNA.

The top 25 upregulated and downregulated genes selected based on fold change are shown (p<0.05, Table 3A). The full result from differential gene expression study is also included (Table 9). Of interest are large number of highly expressed upregulated genes pertain to interferon-mediated responses, including the interferon-stimulated gene family ISG56/IFIT consisting of IFIT1, IFIT2, IFIT3, and IFIT4, the 2'-5'-oligoadenylate synthetase 2 family (OAS) consisting of OAS2 and OAS3 and the chemotactic factor chemokine CCL8. For the downregulated genes, zinc finger proteins and ribosomal related genes were found in large numbers and highly represented. Gene set enrichment analysis (Table 9) for KEGG Pathway identified enrichment for NOD-like receptor signaling, RIG-I like receptor signaling, and cytosolic DNA-sensing pathway for upregulated genes in post-ICH seizure. For downregulated genes in post-ICH seizure, only the ribosome pathway was found significant. GO analysis for upregulated genes showed a vast number of enrichment for biological processes relating to immune and defense responses; whereas a vast number of enrichment for molecular function relating to nucleotide binding and activity. In contrast, GO analysis for downregulated genes in post-ICH seizure were predominantly involved in RNA and protein processing.

Integrated miRNA-mRNA Network Analysis

Figure 3A:
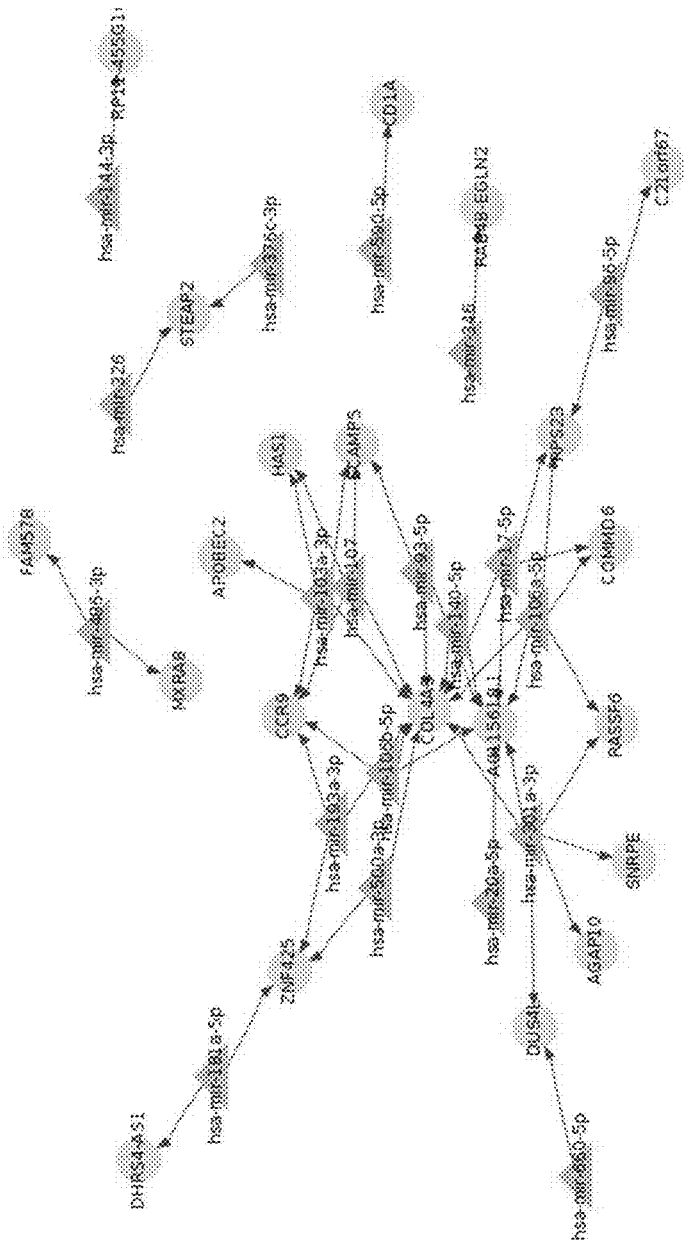
FIGS. 3A and 3B show the regulatory network of miRNA-mRNA in A) upregulated miRNA-downregulated mRNA and B) upregulated miRNA-upregulated mRNA.

Regulatory network analysis for the differentially expressed miRNA data matched to the corresponding mRNA-Seq data were carried out using MAGIA$^2$ (Bisognin et al., Nucleic Acids Res. 2012 July; 40(Web Server issue): W13-21). The number of differentially expressed miRNA (129 miRNA), upregulated transcripts (331 genes), and downregulated transcripts (136 genes) were used to identify interaction between miRNA, genes, and transcription factors. The general assumption is that the expression of the individual miRNA is negatively correlated with the expression levels of their target genes. Hence, if the expression of the individual miRNA is not expressed or decreased, then the target genes of that miRNA are expressed or upregulated. Interactions using matched miRNA-mRNA data set were carried out by Pearson correlation analysis based on the DIANA microT target prediction for the top 75% targets. As shown for the down-regulated genes (20/46 direct interactions), regulatory network analysis identified interactions for miRNA that were found increased in post-ICH seizure, of which 20 out of 46 possible miRNA-mRNA interactions were found that may be associated with post-ICH seizure. No miRNA-mRNA interactions were found for the downregulated miRNA. The prominent negative correlation of upregulated miRNA and downregulated mRNA targets identified for hsa-mir-106a (MI0000113) included ribosomal protein 23 (RPS23), copper metabolism gene MURR1 domain (COMMD)-6 (COMMD6), Ras association domain family member 6 (RASSF6), collagen type IV alpha 4 chain (COL4A), and ENSG00000204620-AC115618.1 (FIG. 3A). Of interest are COMMD6 and apolipoprotein B mRNA editing catalytic subunit 2 (APOBEC2), as well as RASSF6 which are involved in the regulation of NF-κB activity (Matsumoto et al., FEBS Lett. 2006 Feb. 6; 580(3):731-5; de Bie et al., Biochem J. 2006 Aug. 15; 398(1):63-71) and RASSF6 and COL4A, which are associated with poor clinical prognosis in cancer (Ye et al., J Gastroenterol. 2015 Jun. 7; 21(21):6621-30). Expressions of COMMD6 and APOBEC2 decreased 2-fold and 32-fold, respectively. Expression of RASSF6 and COL4A decreased 4-fold and 9-fold, respectively. Hsa-mir-301a-3p (MI0000745) targets also included RASSF6 and COL4A, AC115618.1, in addition to ArfGAP with GTPase domain, ankyrin repeat and PH domain 9 (AGAP9), small nuclear riboprotein polypeptide E (SNRPE), and dihydrouridine synthase 4 like (DUS4).

Figure 3B:
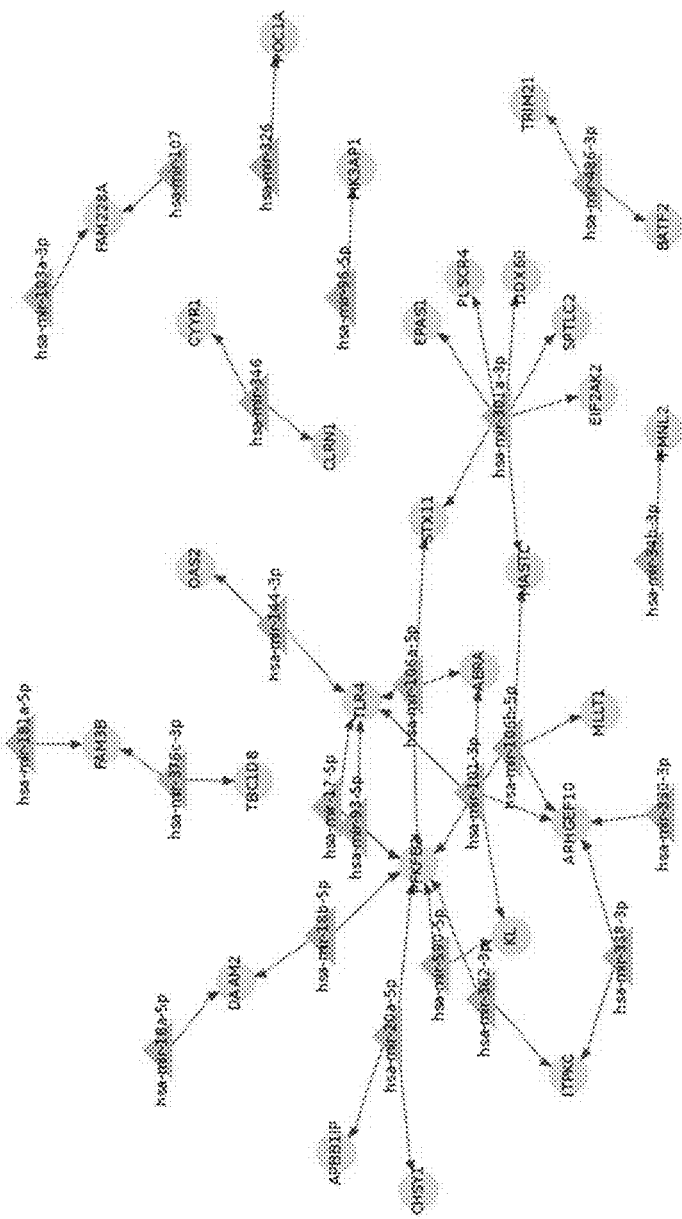

For upregulated miRNA and upregulated mRNA targets, the regulatory network is shown (FIG. 3B). The hsa-mir-301a-5p (MI0000745), hsa-mir-106a (MI0000113), hsa-mir-590-5p (MIMAT0003258), and hsa-mir-101-3p (MI0000103) formed the most prominent regulatory network. Positive correlation for hsa-mir-106a target genes included 6-phosphofructo-2-kinase/fructose-2,6-biphosphatase 2 (PFKFB2), Toll-like receptor 4 (TLR4), actin binding Rho-activating protein (ABRA), and syntaxin 11 (STX11). The first three hsa-mir-106a gene targets are also gene targets of hsa-miR-101-3p, plus Rho guanine nucleotide exchange factor 10 (ARHGEF10) and klotho (KL). Hsa-miR-301a-3p (MI0000745) shares STX11 with hsa-mir-106a-5p (MIMAT0000103) and serine/threonine protein kinase 1 (MAST1) with hsa-miR-106b-5p (MIMAT0000680). Other gene targets of hsa-mir-301a-3p (MIMAT0000688) included phospholipid scramblase 4 (PLSCR4), endothelial PAS domain-containing protein 1 (EPAS1), ATP-dependent RNA helicase (DDX60), eukaryotic initiation factor 2-alpha kinase 2 (EIF2AK2), and serine palmitoyltransferase, long chain base subunit 2 (SPTLC2).

Discussion

The present study compared miRNA and mRNA levels in peripheral whole blood of post-ICH patients with long term seizures at 1-year, post-ICH patients without long term seizures at 1 year and healthy controls. The overall goal of the study was to identify known mature miRNA to the mRNA targets and to identify miRNA-mRNA regulatory networks that may serve as biomarkers and therapeutic targets in the management of patients with post-ICH seizures.

The disclosed study identified significantly greater numbers of upregulated than downregulated miRNAs in post-ICH seizures than in non-seizure ICH plus healthy control samples. Furthermore, the magnitude of change (i.e. foldchange) were small for all these significantly expressed miRNA. When miRNA distributions were compared among the three groups, 6 miRNA were identified that distinguish post-ICH seizures from non-seizure (ICH and healthy normal controls). Two downregulated miRNA, hsa-miR-4317 (MI0015850) and hsa-miR-4325 (MI0015865), and two upregulated miRNA, hsa-miR-101-3p (MI0000103) and hsa-miR-106a-5p (MIMAT0000103) were selected for realtime PCR validation with additional post-ICH seizure and non-seizure ICH samples.

Gene set enrichment analysis for GO and KEGG signaling pathways identified enrichment for a wide array of biological, molecular, and signaling pathways that may be attributable to the increased expression of these miRNA, hence the physiological and biological processes that may be altered through post-transcriptional regulation. Concurrently, gene expression data and GSEA of downregulated genes identified enrichment for ribosomal pathway and protein processing suggesting that these processes are suppressed in post-ICH seizure. Furthermore, miRNA-mRNA network analysis and gene network component functional analysis identified enrichment for endosome, integral and transmembrane components of plasma membrane. This indicates that in post-ICH seizures, synthesis and processing of membrane components may be curtailed and that dynamic of membrane components is tightly regulated. Conversely, miRNA-mRNA network and network component analysis found positive correlation relationship of upregulated miRNA and upregulated mRNA, and that functional analysis found enrichment for inmate immune response.

Interestingly, the negative correlation of increased expression of miR-17-5p (MIMAT0000070) and mir-106a-5p which may be targeting COMMD6 that is involved in downregulating NF-kB activity and that of miR-103a-3p and mir-107 which target APOBEC2 and SCAMPS, a secretory carrier membrane protein 5 required for the calcium-dependent exocytosis of cytokines, such as CCL5, suggest NF-κB activation of cytokine cascade may be affected in post-ICH seizure. Failure to control NF-κB signaling cascade may negatively impact and possibly be detrimental to healing and outcome.

ICH is associated with a complex interplay of proinflammatory molecular changes that are associated with outcomes. NF-κB, TLR4, interleukin-1 beta (IL-1β), COX-2 released by microglia and infiltrating leucocytes play important role in the pathologic changes and poor outcomes following ICH (Zhao et al., Nat Med. 2006 April; 12(4): 441-5' Gong et al., Brain Res. 2001 May 18; 901(1-2):38-46; Rodriguez-Yáñez et al., Neurologia; Mracsko et al., Brain Behav Immun. 2014 October; 41:200-9). These proinflammatory molecules such as IL-1β and COX-2 are implicated in epileptogenesis (Phillis et al., Brain Res Rev. 2006 September; 52(2):201-43; Lukiw et al., Biochem Biophys Res Commun. 2005 Dec. 9; 338(1):77-81; Diamond et al., Epilepsia. 2015 July; 56(7):991-1001). In the studies disclosed herein of the two miRNA that were found decreased in the post-ICH seizure cohort and confirmed by PCR, miR-4325 may target MAPK8, also termed JNK1 which is the main component of the proinflammatory and stress activated MAP kinase signaling pathway. A decrease of miR-4325 correlates with an increase expression of MAPK8 or activation of the JNK1 pathway. Previous studies have shown the role of the p42/p44 MAP kinase pathway activation on tumor necrosis factor alpha (TNF-α), interleukin-1 beta (IL-1β), and interleukin-6 (IL-6), as well as COX-2 (Hu et al., J Ethnopharmacol. 2011 Oct. 11; 137(3):1462-8; Ohnishi et al., Neuroscience. 2013 Mar. 1; 232:45-52; Yang et al., Int J Neurosci. 2016; 126(3):213-8). Furthermore, RNAseq data showed downregulation of COMMD6, another regulator of NF-κB activation (FIG. 3). A decrease of COMMD6 expression suggests the reduced capacity to inhibit TNF-α activation of NF-κB. A validated target of miR-4317 based on the miRTarBase is SL38A1, a solute carrier family 38 member 1 also known as SNAT1. SL38A1 is an important glutamine transporter and glutamine is required for protein synthesis, osmoregulation, and glutamate synthesis (Bröer et al., J Neurochem. 2001 May; 77(3):705-19). The 5-fold decreased expression of miR-4317 in post-ICH seizure cohort compared to non-seizure cohort implicates the glutamine-glutamate transport system. The decreased expression of miR-4317, hence an increase level of SL38A1, indicates an increase transport of glutamine from the extracellular space into the cells to stimulate glutamine-glutamate cycling. The role of excessive glutamatergic neurotransmission in epileptogenesis and refractory epilepsy is well recognized and remains a focus intense research (Cho, Exp Mol Med. 2011 May 31; 43(5):231-74). Hence, the decreased expression of miR-4317 is an early biomarker and potential therapeutic target. Following ICH, clinical outcomes are determined by the final hematoma size, hematoma expansion, cerebral edema, and presence of systemic complications (Keep et al., Lancet Neurol. 2012 August; 11(8):720-31; Zheng et al., CNS Neurosci Ther. 2012 December; 18(12):1003-11; Rodriguez-Yáñez et al., Neurologia. 2013 May; 28(4):236; Broderick et al., Stroke. 1993 July; 24(7):987-93). These events lead to activation of microglial cells, breakdown of the blood-brain barrier, and recruitment of leukocyte with a prolonged inflammatory response that potentiates secondary brain injury (Mracsko et al., Brain Behav Immun. 2014 October; 41: 200-9). This ultimately leads to neuronal cell death and accentuation of neuroinflammation creating a vicious cycle of secondary brain injury. The results in this study suggests that an expression pattern promoting innate inflammatory pathways is likely associated with post-ICH seizures. This is in line with the current knowledge of the role of inflammation in epileptogenesis (Vezzani A, Friedman A, Dinglediene R J. The role of inflammation in epileptogenesis. Neuropharmacology. 2013 June; 69: 16-24).

TABLE 9

All Differentially Expressed Genes

| Gene Symbol | Log2 | P-Value | Gene Symbol | Log2 | P-Value |
| --- | --- | --- | --- | --- | --- |
| RP11-1212A22.2 | −5.29 | 4.13E−004 | POC1B-GALNT4 | 8.83 | 5.90E−007 |
| XXbac-BPG116M5.15 | −4.64 | 1.43E−003 | AC120194.1 | 7.24 | 6.09E−003 |
| RP11-458D21.5 | −4.23 | 1.25E−002 | RAB4B | 6.87 | 4.00E−002 |
| PLSCR4 | −3.93 | 7.01E−005 | ASB16-AS1 | 6.64 | 3.31E−002 |
| PTPRR | −3.72 | 2.61E−002 | FKSG63 | 6.47 | 2.29E−002 |
| RSAD2 | −3.62 | 9.45E−006 | HLA-DMB | 6.45 | 5.73E−003 |
| HERC5 | −3.54 | 2.23E−008 | CTD-2192J16.24 | 6.20 | 4.61E−002 |
| PCDH8 | −3.53 | 3.61E−002 | ADARB2 | 6.06 | 8.32E−003 |
| AC016722.2 | −3.46 | 1.57E−003 | COX6A1P2 | 5.77 | 8.17E−003 |
| C17orf61-PLSCR3 | −3.43 | 2.65E−002 | PAGE2B | 5.57 | 1.08E−002 |
| RP1-241P17.4 | −3.43 | 2.65E−002 | CKLF-CMTM1 | 5.55 | 3.47E−002 |
| C19orf81 | −3.43 | 2.65E−002 | AC037459.4 | 5.53 | 4.08E−002 |
| ABRA | −3.39 | 2.84E−002 | DHRS4-AS1 | 5.18 | 3.03E−002 |
| IFIT1 | −3.31 | 8.78E−006 | C19orf33 | 5.17 | 6.91E−003 |
| OAS3 | −3.29 | 1.85E−007 | CLEC18B | 5.00 | 4.95E−002 |
| RORB | −3.27 | 3.48E−002 | APOBEC2 | 4.99 | 8.29E−003 |
| WEE2 | −3.26 | 2.42E−002 | NEBL | 4.91 | 1.32E−002 |
| RNF17 | −3.25 | 4.51E−002 | CTD-2054N24.2 | 4.80 | 3.10E−003 |
| ZNF729 | −3.25 | 4.52E−002 | STEAP2 | 4.70 | 1.09E−002 |
| MX1 | −3.18 | 3.40E−007 | GREM2 | 4.58 | 1.18E−002 |
| OTOF | −3.17 | 3.80E−004 | ISPD | 4.55 | 4.12E−002 |
| CMPK2 | −3.01 | 2.42E−006 | SEMG1 | 4.48 | 1.64E−002 |
| CCL8 | −2.98 | 1.90E−003 | AL136531.1 | 4.47 | 9.45E−003 |
| C1orf146 | −2.96 | 3.06E−002 | AC023590.1 | 4.38 | 2.86E−002 |
| MYLPF | −2.92 | 1.98E−003 | C2CD4A | 4.36 | 2.64E−002 |
| OAS2 | −2.88 | 1.51E−007 | FLJ27352 | 4.27 | 2.40E−002 |

TABLE 9-continued

All Differentially Expressed Genes

| Gene Symbol | Log2 | P-Value | Gene Symbol | Log2 | P-Value |
|---|---|---|---|---|---|
| USP18 | −2.88 | 2.69E−005 | FGF22 | 4.17 | 4.35E−002 |
| FAM107A | −2.87 | 9.37E−004 | ZNF709 | 3.98 | 9.49E−003 |
| PCDH11Y | −2.78 | 2.89E−002 | FGF13 | 3.29 | 8.65E−003 |
| NR2E1 | −2.76 | 2.10E−002 | AP3B2 | 3.28 | 3.14E−002 |
| SLC1A3 | −2.72 | 1.90E−004 | COL4A3 | 3.22 | 5.77E−004 |
| IFIT2 | −2.72 | 8.97E−009 | NBEA | 3.21 | 3.50E−003 |
| ISG15 | −2.72 | 4.62E−004 | GLDC | 3.17 | 3.89E−002 |
| IFIT3 | −2.70 | 1.62E−005 | RPP14 | 3.16 | 3.84E−002 |
| IFI44 | −2.70 | 5.41E−005 | ABI3BP | 2.90 | 9.26E−003 |
| CLRN1 | −2.69 | 2.64E−002 | PBOV1 | 2.85 | 2.69E−002 |
| OASL | −2.69 | 2.21E−006 | PCSK4 | 2.79 | 3.67E−002 |
| VWA3B | −2.60 | 6.08E−003 | S100A1 | 2.77 | 4.71E−002 |
| FAM180B | −2.59 | 2.34E−002 | FAM57B | 2.76 | 2.71E−002 |
| TRIM6 | −2.55 | 4.92E−006 | MOGAT3 | 2.75 | 2.65E−002 |
| LY6E | −2.50 | 6.43E−005 | SLC4A10 | 2.52 | 3.49E−002 |
| FUT3 | −2.50 | 4.82E−002 | CLEC4C | 2.51 | 1.07E−002 |
| C16orf71 | −2.49 | 2.53E−002 | SLC12A3 | 2.47 | 1.33E−002 |
| IFI44L | −2.47 | 4.53E−003 | ZNF551 | 2.41 | 2.80E−002 |
| BEST2 | −2.43 | 3.82E−002 | TMEM117 | 2.35 | 1.94E−002 |
| FAP | −2.41 | 3.02E−002 | NME1-NME2 | 2.33 | 1.66E−002 |
| PPP3R2 | −2.39 | 3.62E−002 | TNFRSF17 | 2.14 | 1.55E−002 |
| ACTRT3 | −2.39 | 2.55E−002 | LGALS2 | 2.13 | 2.12E−004 |
| CD177 | −2.38 | 1.03E−002 | RP11-455G16.1 | 2.00 | 3.90E−002 |
| IFI6 | −2.37 | 9.00E−004 | SDC2 | 1.93 | 5.01E−003 |
| MEIG1 | −2.35 | 3.93E−002 | RASSF6 | 1.92 | 1.96E−002 |
| SERPING1 | −2.34 | 3.66E−004 | BHLHE41 | 1.87 | 3.75E−002 |
| HIST1H3B | −2.33 | 3.27E−002 | ZNF425 | 1.86 | 4.04E−003 |
| OAS1 | −2.32 | 3.14E−005 | SERPINE3 | 1.86 | 1.96E−002 |
| GRIK4 | −2.31 | 2.14E−002 | OLR1 | 1.86 | 3.57E−002 |
| C1orf134 | −2.31 | 2.68E−002 | GPRC5A | 1.81 | 3.28E−002 |
| EPSTI1 | −2.30 | 1.16E−004 | IGLL1 | 1.76 | 3.59E−002 |
| SLC45A2 | −2.30 | 4.91E−002 | CABP4 | 1.76 | 6.50E−003 |
| AGRN | −2.26 | 5.59E−005 | MXRA8 | 1.74 | 1.54E−002 |
| ZNF474 | −2.24 | 2.34E−002 | SCAMP5 | 1.73 | 2.65E−002 |
| CD163L1 | −2.22 | 2.17E−002 | C21orf119 | 1.70 | 4.63E−002 |
| DLC1 | −2.20 | 1.64E−002 | FSD2 | 1.66 | 1.70E−003 |
| ETV7 | −2.19 | 3.96E−004 | HAS1 | 1.66 | 2.01E−002 |
| PPIAL4D | −2.16 | 1.23E−002 | GINS1 | 1.64 | 2.98E−002 |
| RPH3A | −2.14 | 1.15E−003 | RP11-297N6.4 | 1.61 | 4.56E−002 |
| AC090616.2 | −2.13 | 5.37E−003 | RP11-54H19.8 | 1.59 | 2.74E−002 |
| MST1R | −2.11 | 2.31E−002 | TMED7-TICAM2 | 1.57 | 1.16E−002 |
| DDX60 | −2.10 | 8.61E−006 | RPL36A | 1.54 | 3.31E−002 |
| DPF1 | −2.08 | 4.21E−002 | NR4A2 | 1.51 | 2.94E−002 |
| FAM90A1 | −2.08 | 1.21E−002 | ZC3H12C | 1.50 | 3.41E−002 |
| IFIT5 | −2.07 | 4.14E−006 | CD1A | 1.47 | 1.78E−002 |
| L1TD1 | −2.04 | 1.44E−003 | EML6 | 1.45 | 4.12E−002 |
| FAM3B | −2.04 | 1.17E−002 | CCR9 | 1.40 | 4.27E−002 |
| FAM228A | −2.03 | 2.94E−002 | PI3 | 1.39 | 2.44E−002 |
| XAF1 | −2.03 | 2.25E−004 | THNSL1 | 1.39 | 3.85E−002 |
| SIGLEC1 | −2.01 | 1.82E−002 | RPL26 | 1.38 | 2.87E−002 |
| IQSEC3 | −2.01 | 1.21E−002 | RPL34 | 1.38 | 2.17E−002 |
| LAMP3 | −2.01 | 8.84E−004 | LAMC1 | 1.36 | 2.75E−002 |
| LINGO2 | −2.00 | 2.48E−002 | JAM3 | 1.34 | 2.21E−002 |
| IL18R1 | −2.00 | 1.59E−003 | TRIM47 | 1.33 | 2.93E−002 |
| LECT2 | −2.00 | 2.65E−002 | HSD17B8 | 1.33 | 4.94E−002 |
| ZCCHC2 | −2.00 | 2.17E−006 | VSIG10 | 1.31 | 1.94E−002 |
| HSD17B2 | −1.97 | 1.70E−002 | SLC23A3 | 1.30 | 4.92E−002 |
| BATF2 | −1.95 | 8.74E−004 | LILRA4 | 1.29 | 1.81E−002 |
| CEACAM1 | −1.93 | 2.31E−005 | ICAM4 | 1.28 | 7.75E−003 |
| IFI27 | −1.89 | 4.98E−002 | AC115618.1 | 1.27 | 4.01E−002 |
| TDGF1 | −1.88 | 1.28E−002 | SNRPE | 1.24 | 4.39E−002 |
| SPATC1 | −1.86 | 4.28E−002 | NECAB2 | 1.22 | 3.00E−002 |
| EXOC3L1 | −1.85 | 3.61E−003 | PUS7 | 1.22 | 3.52E−002 |
| DHX58 | −1.84 | 1.27E−004 | PDXP | 1.19 | 4.08E−002 |
| SPATS2L | −1.84 | 2.55E−003 | C2orf81 | 1.19 | 3.93E−002 |
| EIF2AK2 | −1.82 | 6.09E−005 | RPL31 | 1.19 | 3.14E−002 |
| AC083862.1 | −1.82 | 7.52E−003 | MAST1 | 1.18 | 3.59E−002 |
| IRF7 | −1.80 | 1.33E−004 | RPS24 | 1.13 | 4.82E−002 |
| AANAT | −1.80 | 4.09E−002 | TBC1D3G | 1.09 | 3.29E−002 |
| LRRC17 | −1.78 | 4.01E−002 | AGAP10 | 1.09 | 1.38E−002 |
| DAAM2 | −1.74 | 1.27E−002 | ZNF8 | 1.07 | 2.17E−002 |
| WDR63 | −1.74 | 3.31E−002 | DUS4L | 1.07 | 3.61E−002 |
| HELZ2 | −1.73 | 3.22E−006 | EEF1B2 | 1.06 | 3.94E−002 |
| IFIH1 | −1.71 | 1.53E−005 | LAPTM4B | 1.01 | 2.25E−002 |
| IGF1 | −1.71 | 1.46E−002 | COMMD6 | 1.00 | 3.94E−002 |
| HERC6 | −1.70 | 2.64E−004 | LRRC37A | 1.00 | 4.93E−003 |

TABLE 9-continued

| All Differentially Expressed Genes | | | | | |
|---|---|---|---|---|---|
| Gene Symbol | Log2 | P-Value | Gene Symbol | Log2 | P-Value |
| CABP5 | −1.70 | 4.79E−002 | | | |
| DDX58 | −1.68 | 1.70E−005 | | | |
| CYYR1 | −1.67 | 3.44E−002 | | | |
| CAMK2A | −1.67 | 4.02E−002 | | | |
| PTPN14 | −1.67 | 2.55E−002 | | | |
| KIR2DL1 | −1.66 | 2.38E−002 | | | |
| SAA2 | −1.65 | 2.27E−002 | | | |
| VSIG4 | −1.64 | 1.01E−002 | | | |
| LPL | −1.64 | 9.07E−003 | | | |
| ZBP1 | −1.63 | 1.38E−004 | | | |
| CREB3L3 | −1.62 | 4.01E−002 | | | |
| CCL3L1 | −1.61 | 3.83E−002 | | | |
| RSPH9 | −1.61 | 9.62E−003 | | | |
| BNC2 | −1.60 | 2.53E−002 | | | |
| CCR1 | −1.58 | 2.11E−004 | | | |
| MX2 | −1.57 | 1.19E−005 | | | |
| IL27 | −1.57 | 1.98E−002 | | | |
| SAMD9L | −1.56 | 4.14E−004 | | | |
| KIAA1958 | −1.56 | 2.00E−004 | | | |
| PLSCR1 | −1.55 | 2.84E−003 | | | |
| SMTNL1 | −1.53 | 4.83E−002 | | | |
| IFITM3 | −1.53 | 7.27E−003 | | | |
| PARP12 | −1.52 | 1.31E−004 | | | |
| RTP4 | −1.51 | 4.32E−003 | | | |
| TOR1B | −1.49 | 1.26E−004 | | | |
| NBPF20 | −1.49 | 6.65E−004 | | | |
| MYCT1 | −1.48 | 3.35E−002 | | | |
| COL9A2 | −1.48 | 6.25E−003 | | | |
| IFI35 | −1.48 | 2.04E−004 | | | |
| BSPRY | −1.46 | 3.26E−002 | | | |
| DOCK1 | −1.46 | 4.59E−002 | | | |
| CXCL10 | −1.46 | 1.47E−002 | | | |
| ARHGEF10 | −1.45 | 1.35E−003 | | | |
| ZNF496 | −1.45 | 6.97E−005 | | | |
| KL | −1.44 | 4.05E−002 | | | |
| TTC26 | −1.44 | 3.63E−003 | | | |
| PFKFB2 | −1.44 | 1.48E−002 | | | |
| PML | −1.44 | 1.79E−005 | | | |
| PCP2 | −1.43 | 5.95E−003 | | | |
| AC092535.1 | −1.42 | 9.95E−003 | | | |
| BRCA2 | −1.41 | 6.74E−003 | | | |
| GNG4 | −1.41 | 2.90E−002 | | | |
| SPRY2 | −1.41 | 1.59E−002 | | | |
| CPNE5 | −1.40 | 1.50E−002 | | | |
| TRIM22 | −1.40 | 1.65E−004 | | | |
| PARP14 | −1.40 | 1.57E−004 | | | |
| LAP3 | −1.39 | 7.72E−004 | | | |
| LRG1 | −1.38 | 9.99E−003 | | | |
| TKTL1 | −1.38 | 2.03E−002 | | | |
| POC1A | −1.37 | 2.96E−003 | | | |
| UBE2L6 | −1.37 | 2.34E−004 | | | |
| BGLAP | −1.35 | 3.17E−002 | | | |
| DDX60L | −1.35 | 3.12E−004 | | | |
| TTC21A | −1.33 | 9.06E−003 | | | |
| SHISA5 | −1.32 | 5.15E−004 | | | |
| IL1RN | −1.32 | 2.30E−003 | | | |
| PMEL | −1.31 | 4.58E−002 | | | |
| TREML4 | −1.30 | 2.89E−002 | | | |
| RGL1 | −1.30 | 6.96E−003 | | | |
| TRIM5 | −1.30 | 7.26E−005 | | | |
| CSRNP1 | −1.29 | 5.86E−003 | | | |
| IFI16 | −1.29 | 9.90E−004 | | | |
| TDRD7 | −1.28 | 1.83E−004 | | | |
| TMEM252 | −1.27 | 3.11E−003 | | | |
| PARP10 | −1.27 | 2.04E−004 | | | |
| DKFZP667F0711 | −1.26 | 4.32E−002 | | | |
| FCGR3B | −1.25 | 1.50E−004 | | | |
| SIPA1L2 | −1.25 | 1.83E−002 | | | |
| DLL1 | −1.25 | 2.55E−002 | | | |
| MT2A | −1.24 | 7.38E−003 | | | |
| RNF213 | −1.22 | 2.93E−004 | | | |
| AL137145.1 | −1.21 | 2.64E−002 | | | |
| SEMA6B | −1.20 | 3.72E−002 | | | |
| APOBEC3B | −1.20 | 1.12E−002 | | | |
| RNF165 | −1.20 | 1.19E−002 | | | |
| SOCS3 | −1.20 | 3.64E−002 | | | |

TABLE 9-continued

All Differentially Expressed Genes

| Gene Symbol | Log2 | P-Value | Gene Symbol | Log2 | P-Value |
|---|---|---|---|---|---|
| NHSL1 | −1.19 | 2.61E−002 | | | |
| FFAR2 | −1.19 | 3.31E−003 | | | |
| CHSY1 | −1.19 | 4.60E−003 | | | |
| TMEM123 | −1.18 | 3.09E−004 | | | |
| PARP9 | −1.18 | 9.15E−004 | | | |
| CD163 | −1.17 | 1.69E−002 | | | |
| TNFSF13B | −1.16 | 1.12E−002 | | | |
| TRIM21 | −1.16 | 7.08E−005 | | | |
| SH2D1B | −1.15 | 1.02E−002 | | | |
| ZNFX1 | −1.14 | 2.72E−004 | | | |
| TIMM10 | −1.13 | 1.45E−002 | | | |
| FTSJD2 | −1.13 | 1.61E−004 | | | |
| MSR1 | −1.12 | 2.63E−002 | | | |
| TREX1 | −1.12 | 7.15E−004 | | | |
| SPON2 | −1.10 | 2.21E−002 | | | |
| BTBD19 | −1.09 | 4.84E−002 | | | |
| TBC1D8 | −1.09 | 4.72E−003 | | | |
| RAB20 | −1.08 | 1.51E−002 | | | |
| DHRS9 | −1.08 | 2.32E−003 | | | |
| MASTL | −1.08 | 4.08E−003 | | | |
| ASAP2 | −1.08 | 4.79E−002 | | | |
| NLRP3 | −1.07 | 1.03E−002 | | | |
| TMEM140 | −1.06 | 1.66E−003 | | | |
| NTNG2 | −1.06 | 3.08E−003 | | | |
| DTX3L | −1.06 | 1.26E−003 | | | |
| CST7 | −1.05 | 2.12E−002 | | | |
| LGALS9 | −1.04 | 2.54E−003 | | | |
| HSH2D | −1.04 | 7.82E−004 | | | |
| EGLN3 | −1.04 | 2.11E−002 | | | |
| ADCY3 | −1.04 | 7.97E−003 | | | |
| STAT1 | −1.04 | 5.75E−003 | | | |
| GBP1 | −1.04 | 3.31E−002 | | | |
| FCGR3A | −1.04 | 1.06E−003 | | | |
| FBXL13 | −1.03 | 2.67E−002 | | | |
| SCN1B | −1.02 | 2.88E−002 | | | |
| C19orf66 | −1.02 | 8.47E−004 | | | |
| POM121L7 | −1.02 | 3.15E−002 | | | |
| CECR6 | −1.01 | 2.84E−002 | | | |
| EPAS1 | −1.00 | 1.31E−002 | | | |
| TRAFD1 | −1.00 | 4.34E−004 | | | |
| SLC26A8 | −1.00 | 3.21E−002 | | | |
| PHF11 | −0.99 | 2.50E−003 | | | |
| KPTN | −0.98 | 1.92E−002 | | | |
| PNPT1 | −0.98 | 2.38E−003 | | | |
| SAMD9 | −0.97 | 3.64E−003 | | | |
| IRF9 | −0.96 | 1.61E−003 | | | |
| ADAR | −0.95 | 2.78E−003 | | | |
| AL359091.2 | −0.95 | 3.23E−002 | | | |
| REC8 | −0.95 | 1.47E−003 | | | |
| DRAP1 | −0.95 | 1.64E−003 | | | |
| FMNL2 | −0.94 | 4.03E−002 | | | |
| BST2 | −0.94 | 1.52E−002 | | | |
| NCOA7 | −0.94 | 2.06E−003 | | | |
| FSD1 | −0.94 | 2.13E−002 | | | |
| STAT2 | −0.94 | 2.62E−003 | | | |
| GPR114 | −0.94 | 2.56E−002 | | | |
| TLR4 | −0.94 | 3.28E−002 | | | |
| FAM19A2 | −0.94 | 2.49E−002 | | | |
| ZC3HAV1 | −0.94 | 3.59E−003 | | | |
| SP100 | −0.93 | 3.64E−003 | | | |
| CLIC3 | −0.91 | 2.23E−002 | | | |
| ADORA3 | −0.91 | 2.21E−002 | | | |
| ACN9 | −0.90 | 2.01E−002 | | | |
| ST3GAL4 | −0.90 | 4.86E−002 | | | |
| NT5C3 | −0.89 | 5.84E−003 | | | |
| SERPINB1 | −0.89 | 2.23E−002 | | | |
| SLC39A11 | −0.89 | 4.09E−003 | | | |
| CCDC71L | −0.89 | 3.97E−002 | | | |
| SECTM1 | −0.88 | 1.32E−002 | | | |
| IFITM1 | −0.88 | 3.49E−002 | | | |
| SELL | −0.88 | 1.35E−002 | | | |
| SP110 | −0.88 | 7.16E−003 | | | |
| GTPBP2 | −0.88 | 1.60E−003 | | | |
| SPATC1L | −0.87 | 2.56E−002 | | | |
| MOB3C | −0.87 | 2.59E−003 | | | |
| PIK3AP1 | −0.87 | 3.48E−002 | | | |

TABLE 9-continued

All Differentially Expressed Genes

| Gene Symbol | Log2 | P-Value |
|---|---|---|
| TMIGD2 | −0.86 | 3.07E-002 |
| NUB1 | −0.86 | 1.52E-003 |
| MLLT1 | −0.85 | 1.73E-002 |
| KIAA1467 | −0.85 | 3.98E-002 |
| FNDC3B | −0.84 | 3.25E-002 |
| NAPA | −0.84 | 1.12E-002 |
| ITPKC | −0.83 | 2.02E-002 |
| DISC1 | −0.83 | 9.11E-003 |
| ARPC4-TTLL3 | −0.83 | 3.62E-002 |
| SLC29A1 | −0.82 | 4.30E-002 |
| RNF31 | −0.82 | 2.21E-002 |
| SPTLC2 | −0.81 | 1.44E-002 |
| TRIM14 | −0.81 | 4.92E-003 |
| STX11 | −0.81 | 3.05E-002 |
| SERPINB9 | −0.81 | 1.20E-003 |
| MPZL1 | −0.81 | 1.84E-002 |
| UNC93B1 | −0.81 | 1.44E-002 |
| HLX | −0.80 | 4.36E-002 |
| RHBDF2 | −0.80 | 4.41E-003 |
| TNFSF10 | −0.79 | 1.51E-002 |
| ARHGAP29 | −0.79 | 3.19E-002 |
| APBB1IP | −0.79 | 4.89E-002 |
| SASH1 | −0.79 | 2.46E-002 |
| TRIM38 | −0.79 | 6.69E-003 |
| GTPBP1 | −0.78 | 9.10E-003 |
| ETV6 | −0.77 | 1.59E-002 |
| FAM46A | −0.77 | 1.35E-002 |
| TRANK1 | −0.77 | 1.10E-002 |
| PRKD2 | −0.76 | 5.33E-003 |
| PATL1 | −0.76 | 5.58E-003 |
| HLA-C | −0.76 | 1.15E-002 |
| APOL1 | −0.76 | 2.42E-002 |
| TAP1 | −0.75 | 1.08E-002 |
| NMI | −0.75 | 1.72E-002 |
| KIAA0319L | −0.74 | 1.01E-002 |
| CYP27A1 | −0.74 | 3.93E-002 |
| OSBPL5 | −0.73 | 1.85E-002 |
| MOV10 | −0.73 | 2.30E-002 |
| PRKAG2 | −0.72 | 1.08E-002 |
| RNF144A | −0.72 | 2.56E-002 |
| TXNIP | −0.71 | 8.57E-003 |
| FBXO6 | −0.70 | 3.33E-002 |
| ZC3H3 | −0.70 | 3.23E-002 |
| LYSMD2 | −0.70 | 2.31E-002 |
| SP140 | −0.70 | 2.29E-002 |
| N4BP1 | −0.67 | 4.00E-002 |
| CDC42EP4 | −0.66 | 4.05E-002 |
| ANKFY1 | −0.65 | 1.89E-002 |
| AFF1 | −0.65 | 2.69E-002 |
| LYRM1 | −0.65 | 3.48E-002 |
| ABCC3 | −0.64 | 3.86E-002 |
| KPNB1 | −0.64 | 3.41E-002 |
| C1GALT1 | −0.64 | 2.58E-002 |
| CNP | −0.63 | 3.51E-002 |
| GIMAP4 | −0.62 | 2.34E-002 |
| TAP2 | −0.61 | 4.78E-002 |
| MAD2L1BP | −0.60 | 4.11E-002 |
| APOL2 | −0.60 | 2.09E-002 |
| USP25 | −0.60 | 3.35E-002 |
| PRKCE | −0.60 | 4.77E-002 |
| PSMB8 | −0.60 | 2.39E-002 |
| IRF2 | −0.58 | 4.77E-002 |
| SLC27A3 | −0.58 | 1.22E-002 |
| SRGAP2 | −0.57 | 3.04E-002 |
| RBCK1 | −0.57 | 4.06E-002 |
| RNF31 | −0.57 | 1.74E-002 |
| TRIM34 | −0.56 | 4.68E-002 |
| TSPAN14 | −0.56 | 3.85E-002 |
| GORASP1 | −0.55 | 2.18E-002 |
| C9orf91 | −0.54 | 4.58E-002 |
| LGALS8 | −0.54 | 4.10E-002 |
| C20orf118 | −0.54 | 4.92E-002 |
| MICB | −0.52 | 4.49E-002 |
| LCP2 | −0.51 | 4.95E-002 |

TABLE 9-continued

| All Differentially Expressed Genes ||||||
| Gene Symbol | Log2 | P-Value | Gene Symbol | Log2 | P-Value |
| --- | --- | --- | --- | --- | --- |
| LPIN2 | −0.49 | 4.81E−002 | | | |
| MESDC1 | −0.49 | 3.81E−002 | | | |
| MIA3 | −0.47 | 4.50E−002 | | | |

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A method of reducing seizures in a human subject predisposed to seizures after an intracerebral hemorrhage, comprising:

measuring hsa-miR-4325, hsa-miR-181a-5p, hsa-miR-1180-3p, and hsa-miR-4317 miRNA in a sample from the human subject within 48 hours of the human subject experiencing an intracerebral hemorrhage, wherein down regulation of hsa-miR-4325 and hsa-miR-4317 and upregulation of hsa-miR-181a-5p and hsa-miR-1180-3p relative to a control miRNA indicates the human subject has a predisposition to seizures; and administering surgical intervention for seizures to the subject with the predisposition to seizures.

2. The method of claim 1, wherein the sample comprises body fluid.

3. The method of claim 1, wherein the sample is a blood sample.

4. The method of claim 1, wherein the predisposition to seizures is from 14 days to 1 year after occurrence of the intracerebral hemorrhage.

* * * * *